(12) United States Patent
Inoue et al.

(10) Patent No.: US 8,516,935 B2
(45) Date of Patent: Aug. 27, 2013

(54) CUTTING TOOL AND CUTTING METHOD USING THE SAME

(75) Inventors: Yoshihiro Inoue, Higashiomi (JP); Masao Takao, Higashiomi (JP)

(73) Assignee: Kyocera Corporation, Kyoto (JP)

( * ) Notice: Subject to any disclaimer, the term of this patent is extended or adjusted under 35 U.S.C. 154(b) by 174 days.

(21) Appl. No.: 12/937,704

(22) PCT Filed: Jun. 26, 2009

(86) PCT No.: PCT/JP2009/061720
§ 371 (c)(1),
(2), (4) Date: Oct. 13, 2010

(87) PCT Pub. No.: WO2009/157540
PCT Pub. Date: Dec. 30, 2009

(65) Prior Publication Data
US 2011/0097167 A1    Apr. 28, 2011

(30) Foreign Application Priority Data

Jun. 27, 2008 (JP) ................................ 2008-169565
Jun. 30, 2008 (JP) ................................ 2008-170175
Jul. 30, 2008 (JP) ................................ 2008-195736
Sep. 8, 2008 (JP) ................................ 2008-229330

(51) Int. Cl.
*B23B 29/02* (2006.01)

(52) U.S. Cl.
CPC ....................................... *B23B 29/02* (2013.01)
USPC ................ 82/159; 407/66; 407/100; 407/103

(58) Field of Classification Search
USPC .............. 407/66, 100, 102, 103, 107; 82/159
IPC ....................... B23B 29/00, 29/02, 29/04, 29/12
See application file for complete search history.

(56) References Cited

U.S. PATENT DOCUMENTS

| | | | |
|---|---|---|---|
| 5,156,503 A | 10/1992 | Tsujimura | |
| 6,974,282 B2 * | 12/2005 | King et al. | 407/107 |
| 2007/0183856 A1 * | 8/2007 | Jansson | 407/66 |

FOREIGN PATENT DOCUMENTS

| | | | |
|---|---|---|---|
| DE | 3725154 A1 * | 2/1988 | |
| EP | 1762320 | 3/2007 | |

(Continued)

OTHER PUBLICATIONS

Patterson, Harvey, Strictly Boring, Oct. 1995, vol. 47, No. 7.*

(Continued)

*Primary Examiner* — Daniel Howell
*Assistant Examiner* — Alan Snyder
(74) *Attorney, Agent, or Firm* — Schlee IP International, P.C.; Alexander R. Schlee

(57) ABSTRACT

A cutting tool is described comprising a cutting insert with an upper surface, a lower surface, a side surface, and a cutting blade formed at the intersection of the upper surface and the side surface, and a holder comprising an insert pocket to which the cutting insert is attached. The cutting insert is attached to the holder in such a manner that the cutting blade projects outward from the front end surface and the outer peripheral surface of the holder. The holder comprises in the outer peripheral surface on a rear end side with respect to the cutting blade a concave curve-shaped first wall surface portion that extends from the vicinity of the insert pocket toward the rear end side. The lower end of the front-end-side edge of the first wall surface portion is disposed at a lower position than the cutting blade.

13 Claims, 22 Drawing Sheets

(56) References Cited

FOREIGN PATENT DOCUMENTS

| JP | 4-2505 | | | 1/1992 |
|----|--------|---|---|--------|
| JP | 11285906 | A | * | 10/1999 |
| JP | 2002-166305 | | | 6/2002 |
| JP | 2005-279855 | | | 10/2005 |
| JP | 2007075933 | A | * | 3/2007 |
| JP | 2007-320012 | | | 12/2007 |

OTHER PUBLICATIONS

English machine translation of DE 3725154 A1.*
English machine translation of JP 2007-075933A.*
English machine translation of JP 11-285906A.*
International Search Report for PCT/JP2009/061720 issued by the Japanese Patent Office dated Sep. 16, 2009.

* cited by examiner (a)

(b)

(a)

(b)

(a)

(b)

CUTTING TOOL AND CUTTING METHOD USING THE SAME

CROSS-REFERENCE TO RELATED APPLICATIONS

This application is a national phase entry based on the International Patent Application PCT/JP2009/061720 filed Jun. 26, 2009 that claims the priority of the Japanese patent application 2008-169565 2008 that was filed on Jun. 27, 2008, Japanese patent application 2008-170175 2008 that was filed on Jun. 30, 2008, Japanese patent application 2008-195736 2008 that was filed on Jul. 30, 2008 and Japanese patent application 2008-229330 2008 that was filed on Sep. 8, 2008. The entire content of these 4 prior Japanese patent applications and of the International Patent Application PCT/JP2009/061720 are herewith incorporated by reference.

TECHNICAL FIELD

The present invention relates to a cutting tool and a cutting method using the same.

BACKGROUND OF THE INVENTION

A cutting tool for machining a workpiece made of metals or the like comprises a holder and a cutting insert attached to the holder. The cutting edge of this cutting insert is located on the front side relative to the front surface of the holder in a direction of a holder axis and is located on the outside relative to the outer peripheral surface of the holder. With such a configuration, the cutting edge comes into contact with the workpiece and the workpiece is cut.

Patent Document 1 discloses a cutting tool having a chip pocket and a first sub-pocket. The chip pocket extends from the periphery toward the rear end side of an insert pocket. At the same time, wall surface portion having a concave-curved surface shape that configures the first sub-pocket is located on the outer peripheral surface side of the holder (4A side), where the cutting edge is located, relative to a center axis of the holder and is formed so as to be located on the upper side relative to the front of the cutting edge. In addition, the wall surface that configures the first sub-pocket is provided by being apart from the insert pocket.

With such a configuration, there is a problem in that a wider chip-discharging space may not be ensured with the first sub-pocket, causing chips to become clogged between the wall surface portion that configures the first sub-pocket and a machined wall surface if the chips flow toward the outer peripheral surface side (4A side) by becoming entangled with the rotation of the workpiece.

PRIOR ART DOCUMENT

Patent Document

Patent Document 1: Japanese Patent Laid Open Publication No. 2005-279855

SUMMARY OF THE INVENTION

A cutting tool according to the present invention comprises: a cutting insert comprising: an upper surface; a lower surface; a side surface; and a cutting edge located on the intersection of the upper surface and the side surface; and a holder comprising a mounting portion at a front end portion thereof. The cutting insert is mounted on the mounting portion such that the cutting edge is protruded outward from an outer peripheral surface of the holder. On the outer peripheral surface of the holder, which is located in a direction of the cutting edge as viewed from the side surface, the holder comprises a first wall surface portion having a concave-curved surface shape that extends from the periphery of the mounting portion toward a rear end side of the mounting portion. A lower end of a front-side edge portion of the first wall surface portion is located at a lower position relative to the cutting edge as viewed from the side surface.

A cutting tool according to the present invention comprises: a cutting insert comprising: an upper surface; a lower surface; a side surface; and a cutting edge located on the intersection of the upper surface and the side surface; and a holder comprising a mounting portion at a front end portion thereof. The cutting insert is mounted on the mounting portion such that the cutting edge is protruded outward from an outer peripheral surface of the holder. The holder comprises a second wall surface portion that is located on the opposite outer peripheral surface with respect to the direction of protrusion of the cutting edge as viewed from the side surface and is connected to the rear end of the mounting portion. The second wall surface portion comprises: a first region at a front side having an inclination being closer to a holder reference surface as approaching the rear end; and a second region on the rear end side of the first region that is located along the holder axis and has an inclination leaving from the holder reference surface as approaching the opposite outer peripheral surface in a cross-section perpendicular to the holder axis and the angle between the holder axis and the upper end portion of the first region is greater than the angle between the holder axis and the upper end portion of the second region as viewed from a planar surface.

A cutting tool according to the present invention comprises: a cutting insert comprising: an upper surface; a lower surface; a side surface; and a cutting edge located on the intersection of the upper surface and the side surface; and a holder comprising a mounting portion at a front end portion thereof, wherein the cutting insert is mounted on the mounting portion such that the cutting edge is protruded outward from an outer peripheral surface of the holder. The holder comprises: a first wall surface portion having a concave-curved surface shape; and a second wall surface portion having a concave-curved surface shape. The first wall surface portion is located on the outer peripheral side from which the cutting edge is protruded as viewed from a front surface. The second wall surface portion is located on the outer peripheral side opposite to the cutting edge as viewed from the front surface. The first wall surface portion and the second wall surface portion are connected with a connecting line.

A cutting tool according to the present invention comprises: a cutting insert comprising: an upper surface; a lower surface; a side surface; and a cutting edge located on the intersection of the upper surface and the side surface; and a holder comprising a mounting portion at a front end portion thereof, wherein the cutting insert is mounted on the mounting portion such that the cutting edge is protruded outward from an outer peripheral surface of the holder. The holder comprises: a first wall surface portion having a concave-curved surface shape; a second wall surface portion having a concave-curved surface shape; and a connecting line connecting the first wall surface portion and the second wall surface portion. The first wall surface portion is located on the outer peripheral side from which the cutting edge is protruded as viewed from a front surface. The first wall surface portion is located on the outer peripheral side from which the cutting edge is protruded as viewed from a front surface. The second wall surface portion is located on the outer peripheral side opposite to the cutting edge as viewed from the front surface. The connecting surface has a concave shape and comprises, in the front side, a region in which the width of a direction orthogonal to the holder axis becomes larger as approaching the rear end side from the front side as viewed from a front surface.

A method of manufacturing a machined workpiece according to the present invention is a method in which a workpiece is cut using the above-mentioned cutting tool. The method comprises steps of: moving the cutting tool relatively closer to the workpiece; rotating the work piece and contacting the cutting edge onto a surface thereof to machine the inner diameter of the workpiece; and separating the cutting tool relatively from the work piece.

Effects of the Invention

For a cutting tool according to the present invention, chips that flow toward the outer peripheral surface side of the holder from which the cutting edge is protruded can be discharged smoothly along the first wall surface portion having a concave curved-shape. Accordingly, the clogging of chips between the outer peripheral surface of the holder from which the cutting edge is protruded and the machined wall surface can be constrained.

In addition, a method of manufacturing a machined workpiece according to the present invention can constrain clogging of chips between the holder and the machined wall surface and a machined workpiece with high finished-surface accuracy can be obtained.

DETAILED DESCRIPTION OF THE DRAWINGS (First Embodiment)

Figure 1:
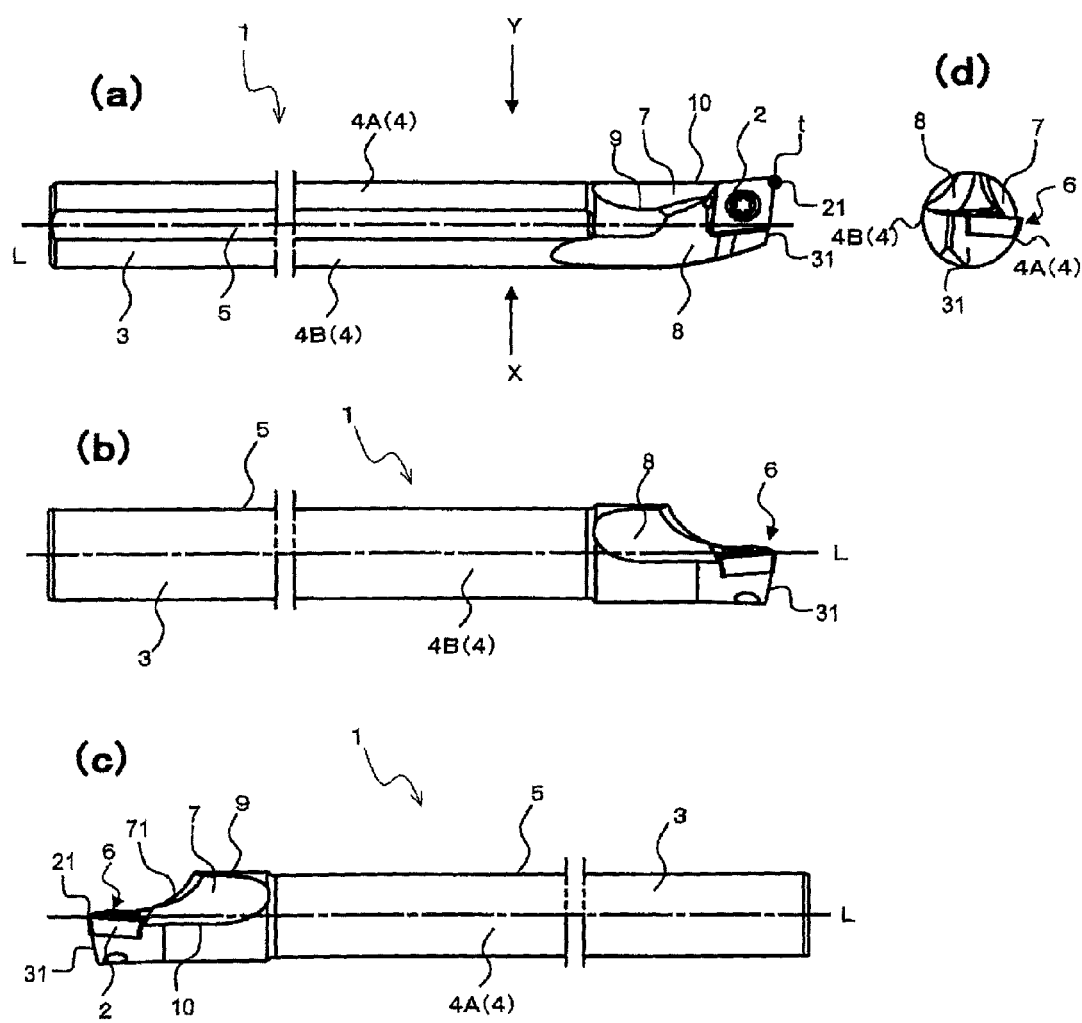
FIG. 1A is a plan view.
FIG. 1B is a side view as viewed from the X-direction and FIG. 1C is a side view as viewed from the Y-direction.
FIG. 1D is a front view (as viewed from the front), all illustrating a cutting tool 1 according to a first embodiment of the present invention.

A cutting tool 1 according to a first embodiment will be described in detail with reference to FIGS. 1 and 2.

A cutting tool 1 (hereinafter referred to as tool 1) comprises a cutting insert 2 and a holder 3.

The cutting insert 2 (hereinafter referred to as "insert 2") has a cutting edge 21, an upper surface 101, a lower surface 102, and a side surface 103. The insert 2 according to the present embodiment has a polygonal plate shape. Specifically, the upper surface 101 of the insert 1 has a diamond shape and comprises four corner portions. In addition, a cutting edge 21 is formed over the corner portions each having acute angles among the four corner portions. The term "cutting edge" as used in the present specification refers to a portion that protrudes outward from the outer peripheral surface of the holder 3 and is actually involved in the cutting of a workpiece during cutting.

The cutting edge 21 is, in the corner portions, formed at the intersection of the side surface 103 and the upper surface 101 of the insert 2. In this configuration, the side surface 103 functions as a flank surface and the upper surface 101 functions as a rake surface.

The holder 3 has a mounting portion (insert pocket 6) on the front thereof. The insert 2 is mounted in the insert pocket 6. In this configuration, the cutting edge 21 protrudes from a front surface 31 and an outer peripheral surface 4 of the holder 3. That is, the cutting edge 21 protrudes toward the front side relative to the front surface 31 and toward the outside relative to the outer peripheral surface 4 of the holder 3. In addition, the side surface and the lower surface of the insert 2 abut the insert pocket 6.

Figure 2:
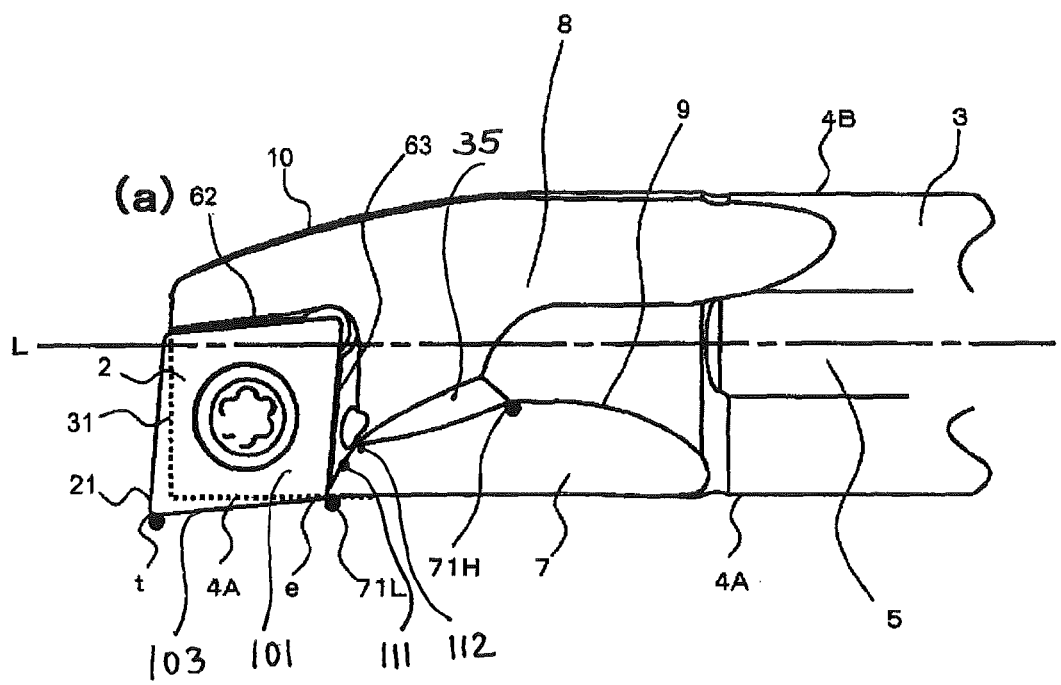
FIG. 2A is an enlarged view of the essential parts of FIG. 1A.
FIG. 2B is an enlarged view of the essential parts of FIG. 1C.
Figure 2:
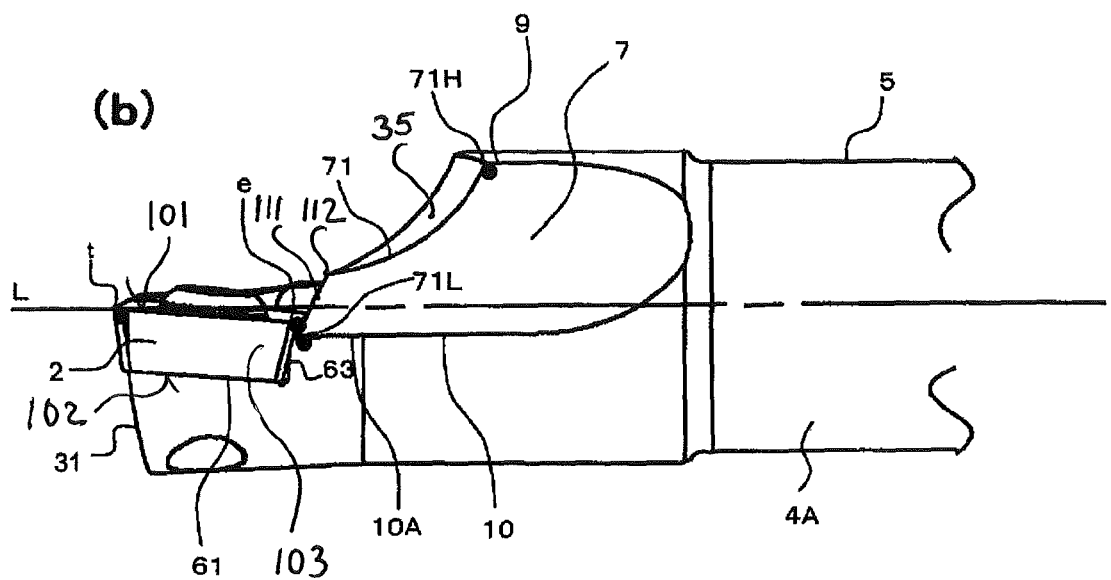

In the present embodiment, as shown in FIG. 2, the insert pocket 6 comprises one restraint seat surface 61 and two restraint side surfaces 62, 63. The restraint side surface 62 is a side surface that is parallel to the axis of the holder 3. Meanwhile, the restraint side surface 63 is a side surface that is substantially orthogonal to the axis of the holder 3.

The restraint seat surface 61 abuts the lower surface of the insert 2, and the restraint side surfaces 62, 63 respectively abut the corresponding side surfaces of the insert 2.

For convenience, the outer peripheral surface portion that is within the outer peripheral surface of the holder and from which the cutting edge 21 protrudes as viewed from the front surface is referred to as an outer peripheral surface 4A. In addition, for convenience, an outer peripheral surface that is located on the radially opposite side from the outer peripheral surface 4A is referred to as an outer peripheral surface 4B. However, if the holder 3 substantially forms a prism shape, the radial direction as used herein refers to a direction perpendicular to an axis L of the holder.

On the outer peripheral surface 4A, which is located on the rear end side relative to the cutting edge 21, of the holder 3, the holder 3 comprises a first wall surface portion 7 that has a concave-curved surface shape with respect to an outer peripheral surface composed of the outermost diameter of the holder 3. Furthermore, if necessary, the outer peripheral surface 4B side may have a second wall surface portion 8. The first wall surface portion 7 is a surface portion that configures a so-called chip pocket through which chips flow toward the outer peripheral surface 4A side. The second wall surface portion 8 configures a chip pocket that is located on the outer peripheral surface 4B side and is a discharging path for discharging chips generated by the cutting edge 21 toward the outer peripheral surface 4B side. The second wall surface portion 8 intersects with the outer peripheral surface 4B and is provided by being connected to the rear end of the insert pocket 6. Further, the first wall surface portion 7 and the second wall surface portion 8 are interconnected with each other by a connecting surface 35. An edge portion 111 of the first wall surface portion 7 at a position close to the mounting portion (insert pocket 6) extends between an upper end point 112 and a lower end point 71L. In the embodiment shown for instance in FIGS. 1 and 2 the edge portion 111 also forms part of the front-side edge portion 71.

As shown in FIG. 2B, the first wall surface portion 7 extends from the periphery of the insert pocket 6 toward the rear end side. In addition, a lower end 71L of the front-side edge portion of the first wall surface portion 7 is located on the lower side relative to the front t of the cutting edge 21. On the other hand, an upper end 71H of the front-side edge portion 71 of the first wall surface portion 7 is located on the upper side relative to the front t of the cutting edge 21. It can be stated that the front side edge portion 71 of the first wall surface portion 7 is arranged from the upper side toward the lower side of the front t of the cutting edge 21 as viewed from the side surface.

Such a configuration allow short chips generated by the cutting edge 21 and minutely divided to discharge smoothly toward the outer peripheral surface 4A side, That is, with this configuration, a space for discharging chips is ensured at a portion that is located on the rear side of the rotational direction of a workpiece relative to the cutting edge 21 that generates chips, that is, at a portion that is located on the lower side of the cutting edge 21 on the outer peripheral surface 4A side as viewed from the side surface. As a result, the clogging of chips between the cutting tool 1 and the workpiece can be constrained at a portion that is located on the rear side of the rotational direction even if chips are entangled with the rotation of the workpiece.

In particular, a chip-discharging space can be ensured on the rear side of the rotational direction even if the tool is used as a regular turning tool, for which it has previously not been possible to ensure a chip-discharging space on the rear side of the rotational direction due to the machining form as compared to cases in which the tool is used as a reverse turning tool.

Here, the regular turning tool is a turning tool used for machining forms in which the holder 3 is attached on an external device so that the rake surface of the insert 2 is directed toward the upper side. In addition, the reverse turning tool is a turning tool used for machining forms in which the holder 3 is attached on an external device so that the rake surface of the insert 2 is directed toward the lower side.

According to the present embodiment, a lower end 71L of the front-side edge portion of the first wall surface portion 7 is located on the lower side relative to the front t of the cutting edge 21 and an upper end 71H of the front-side edge portion 71 of the first wall surface portion 7 is located on the upper side relative to the front t of the cutting edge 21. As a result, a space for discharging chips to the lower side of the cutting tool 21 can be ensured even with machining forms where the tool is used as a regular turning tool in which the falling direction of chips does not match with the direction of release of the rake surface.

Accordingly, in the present embodiment, since the chip-discharging space can be ensured at a portion that is located on the rear side of the rotational direction, a space can be provided between the first wall surface portion 7 and a workpiece. As a result, generated short chips can be discharged smoothly toward the outer peripheral surface 4A side via the space. In particular, when the tool is used as a regular turning tool, the chip-discharging properties can be improved further because the rear side of the rotational direction matches the falling direction that is a direction in which gravity acts.

Therefore, the tool 1 can not only improve the chip-discharging properties in a reverse turning tool but also provides good chip-discharging properties in a regular turning tool, in which replacement work of the insert 2 is easy but there has previously been concern over the chip-discharging properties.

In the present embodiment, the first wall surface portion 7 is adjacent to the restraint surface 63 of the insert pocket 6. Accordingly, short chips generated by the cutting edge 21 can be discharged more smoothly.

In addition the lower end 71L of the front-side edge portion of the first wall surface portion 7 is located on the lower side relative to the front t of the cutting edge 21. Accordingly, when cutting fluid is supplied from the exterior of the tool 1, the cutting fluid can be sprayed appropriately on the front t of the cutting edge 21.

That is, in the present embodiment, the first wall surface portion 7 that is adjacent to the restraint surface 63 of the insert pocket 6 functions not only as a guiding surface for chips but also as a guiding surface that directs the direction of supply of the cutting fluid. The cutting fluid supplied along the first wall surface portion 7 in this way is sprayed on the front t of the cutting edge 21 that is located on the upper side relative to the lower end 71L of the front-side edge portion 71 of the first wall surface portion 7. Therefore, such a configuration of the present embodiment has the effects of both improving the chip-discharging properties and constraining temperature increases of the cutting edge 21.

The term "upward" as used in the specification refers to the direction approaching the upper surface side from the lower surface of the insert 2. A holder reference surface 5 is a surface that becomes a reference surface when attaching the cutting tool 1 on an external device. That is, the holder reference surface 5 is a surface that is utilized for positioning the holder when attaching it on an external device. In the present embodiment, the holder reference surface 5 is located on the upper surface side of the holder 3 and is a plane surface that extends along the axis of the holder 3 as shown in FIG. 1B.

In the present embodiment, the front-side edge portion 71 connects to the insert pocket 6. The phrase "the front-side edge portion 71 connects to the insert pocket 6" as used herein refers to a state in which at least part of the front-side edge portion 71 connects to the insert pocket 6. In the present embodiment, the lower end 71L side of the front-side end portion of the first wall surface portion 7 connects to the upper end side of the restraint side surface 63 of the insert pocket 6 and a portion that is located on the outer peripheral surface 4A side.

In the present embodiment, the lower end 71L of the front-side end portion of the first wall surface portion 7 is located on the lower side relative to a rear end e of the cutting edge 21.

Accordingly, a wider chip-discharging space can be ensured at a portion that is located on the rear side of the rotational direction of a workpiece. In addition, when cutting fluid is supplied from the exterior of the tool 1, the cutting fluid can be sprayed not only on the front t but also on the rear end e of the cutting edge 21. Therefore, the effect of improving the chip-discharging properties and the cooling effect caused by the cutting fluid can both be enhanced.

As shown in FIG. 2B, the lower end 71L of the front-side edge portion of the first wall surface portion 7 is more preferably located on the upper side relative to the lower surface of the insert 2. Such a configuration can ensure an area of the restraint surface 63 that restrains the side surface of the insert 2 while improvements of both the chip-discharging properties and a coolant action can be realized.

According to the present embodiment, as viewed from the front surface, the first wall surface portion 7 having a concave-curved surface shape forms a concave shape toward the outside, as shown in FIG. 1D. As viewed from the upper surface, the first wall surface portion 7 forms a concave shape toward the outside, as well. Such a configuration can cause a reduction in frictional resistance generated by chips and the first wall surface portion 7.

Furthermore, as viewed from the upper surface, the first wall surface portion 7 is located on the outer peripheral surface 4A side relative to an axis L of the holder 3. With such a configuration, the rigidity of the holder 3 can be increased.

According to the present embodiment, a lower-end-side edge portion 10 of the first wall surface portion 7 comprises, on the front side thereof, a parallel region 10A that is parallel to a holder axis. The parallel region 10A is substantially parallel to the holder reference surface 5 as viewed from the side surface. That is, the lower-end-side edge portion 10 of the first wall surface 7 is located on the lower side relative to the cutting edge 21 within a fixed range of the front side. In addition, the height with respect to the cutting edge 21 is constant within the fixed range. With such a configuration, if cutting fluid is externally supplied, the cutting fluid can be supplied stably toward the front t of the cutting edge 21 in addition to the effect that the chip-discharging space is ensured at a portion that is located on the rear side of the rotational direction to improve the chip-discharging properties. Therefore, the chip-discharging properties as well as the cooling effect caused by the cutting fluid can be improved.

In the present invention, the holder 3 further comprises a second wall surface portion 8 having a concave-curved surface shape on the outer peripheral surface 4B that is located on the radially opposite side of the outer peripheral surface 4A. This second wall surface portion 8 functions as a discharging path for longer chips generated during machining of a ductile workpiece. That is, the second wall surface portion 8 functions as a guiding surface for smoothly discharging the longer chips toward the outer peripheral surface 4B side if the longer chips flow through toward the outer peripheral surface 4B side. As a result, good chip-discharging properties can be provided even with machining forms that generate longer chips.

(Second Embodiment)

Figure 3:
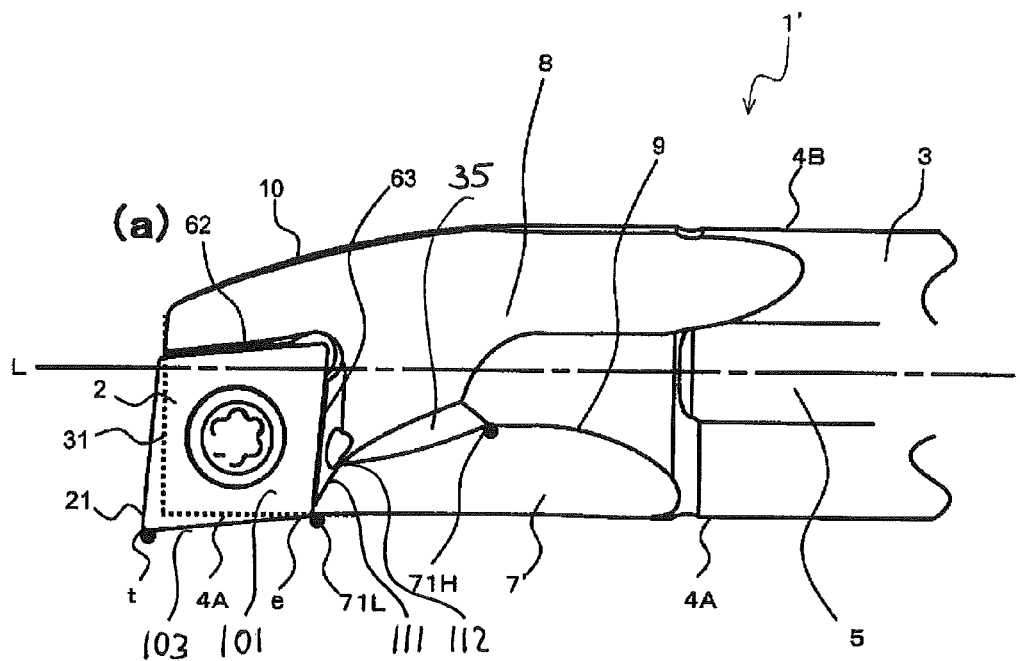
FIG. 3A is a plan view and FIG. 3B is a side view, both illustrating a cutting tool according to a second embodiment of the present invention.
Figure 3:
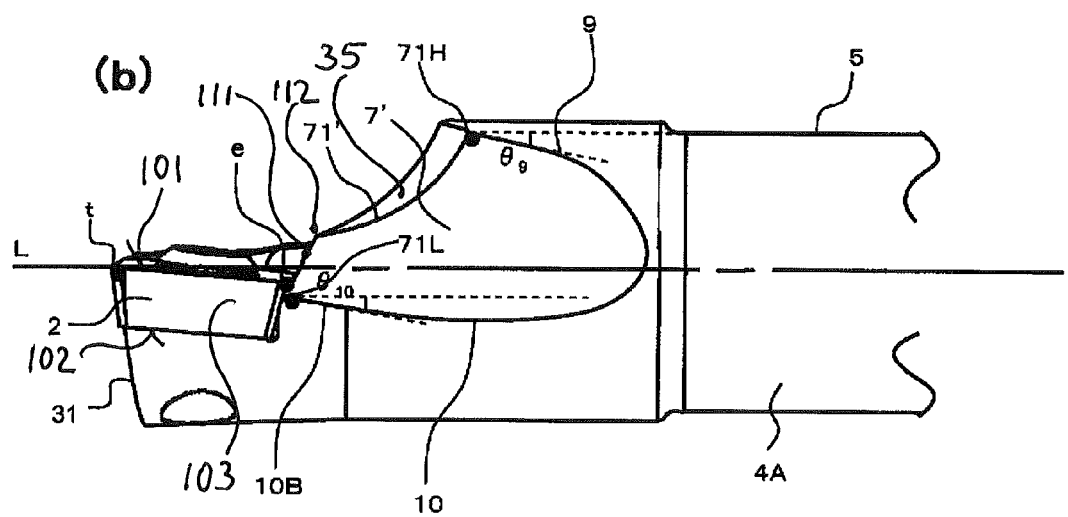

A tool 1' (hereinafter referred to as tool 1') according to a second embodiment is described in detail below with using FIG. 3. Identical reference numerals are used to refer to components similar to those of the tool 1 of the first embodiment.

The tool 1' of the present embodiment is different from tool 1 in the configuration of the holder 3. Specifically, the configuration of a first wall surface portion 7' of the holder 3 is different.

In the present embodiment, the lower-end-side edge portion 10 of the first wall surface portion 7' comprises, on the front side, an inclined region 10B that is inclined so as to be located on the lower side as approaching the rear end side.

With such a configuration, the chips can be guided with the first wall surface portion 7' so that the discharging direction of the chips flowing through toward the outer peripheral surface 4A side will form a spiral shape. Therefore, the chips can be discharged smoothly to the outer peripheral surface 4A side even if the tool 1' is used as a regular turning tool that makes chips stably curved.

Furthermore, in the present invention, the upper-end-side edge portion 9 of the first wall surface portion 7' is also inclined so as to be located on the lower side as approaching the rear end side.

With such a configuration, the chip-discharging properties can be improved while securing the rigidity of the holder 3. In the present invention, the lower-end-side edge portion 10 is substantially parallel to an upper-end-side edge portion 9 as viewed from the side surface. That is, as viewed from the side surface, an inclination angle of the lower-end-side edge portion 10 and an inclination angle $\theta_9$ of the upper-end-side edge portion 9 ($\theta_{10}$, $\theta_9$) are substantially equal ($\theta_{10}=\theta_9$). Such a configuration is preferable from the perspective of improving the rigidity of the holder 3.

The inclination angles of the lower-end-side edge portion 10 and the upper-end-side edge portion 9 are not limited to a form in which they are substantially parallel as shown in the present invention. For example, the inclination angle $\theta_{10}$ of the lower-end-side edge portion 10 may be greater than the inclination angle $\theta_9$ of the upper-end-side edge portion 9. Such a configuration is preferable from the perspectives of both improving the chip-discharging properties and improving the rigidity of the holder 3.

The inclination angle of the lower-end-side edge portion 10 and the inclination angle of the upper-end-side edge portion 9 ($\theta_{10}$ and $\theta_9$) as used herein refer to downward inclination angles of the lower-end-side edge portion 10 and the upper-end-side edge portion 9 with respect to the holder reference surface 5 as shown in FIG. 3B. Specifically, $\theta_{10}$ and $\theta_9$ are the inclination angles at the front sides of the lower-end-side edge portion 10 and the upper-end-side edge portion 9. If each edge portion forms a curve, the angles between the tangential line of each edge portion at the front of the lower-end-side edge portion 10 and the upper-end-side edge portion 9 and the holder reference surface 5 shall be $\theta_{10}$ and $\theta_9$.

(Third Embodiment)

Figure 4:
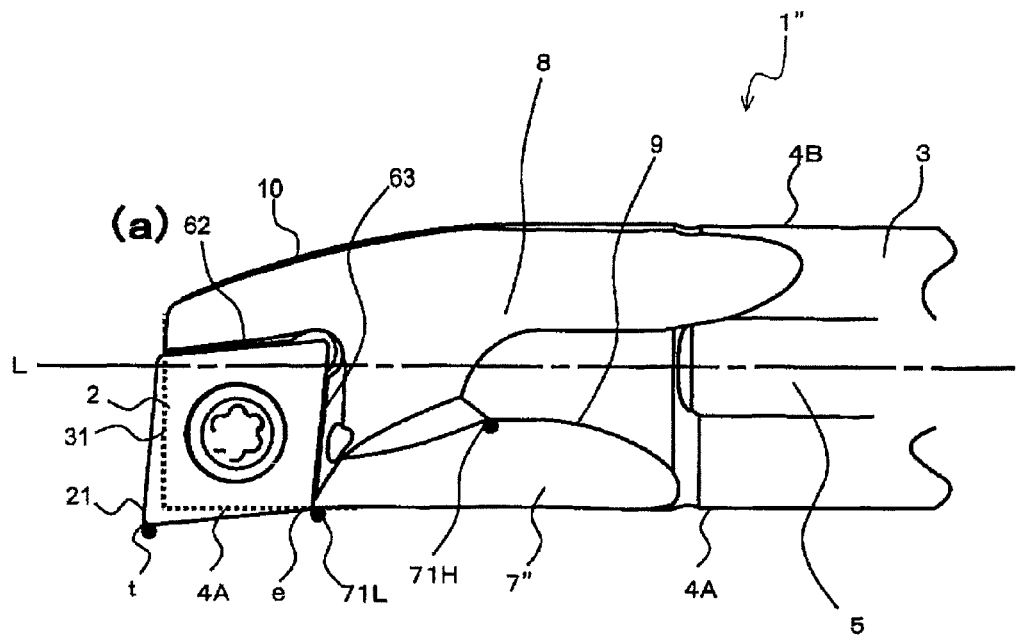
FIG. 4A is a plan view and FIG. 4B is a side view, both illustrating a cutting tool according to a third embodiment of the present invention.
Figure 4:
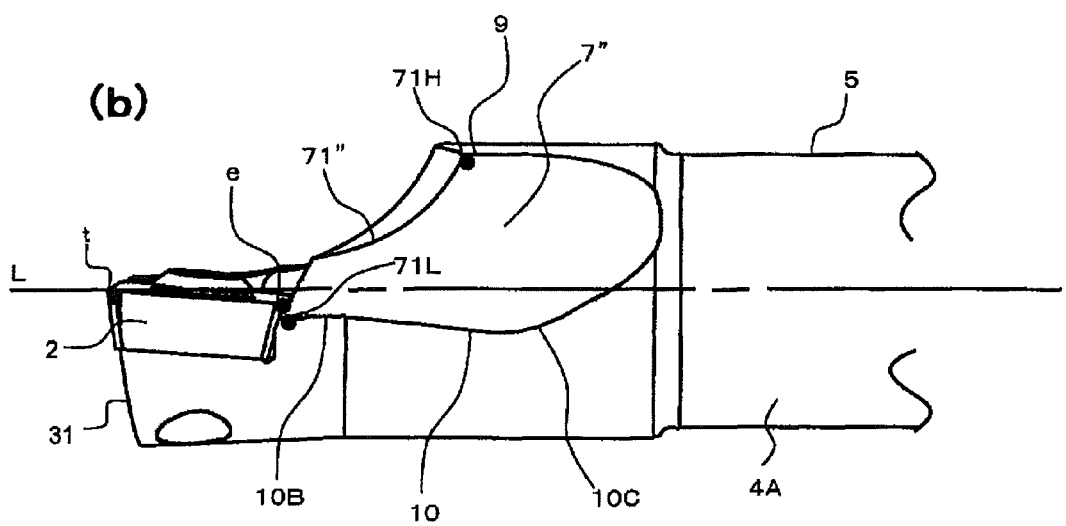

A tool 1" (hereinafter referred to as tool 1") according to a third embodiment of the present invention is described in detail below with using FIG. 4.

The tool 1" of the present embodiment is different from tool 1 in the configuration of the holder 3. Specifically, the configuration of a first wall surface portion 7" of the holder 3 is different.

In the present embodiment, the lower-end-side edge portion 10 of the first wall surface portion 7' comprises, on the rear side of the inclined region 10B, a second inclined region 10C that is inclined so as to be located on the upper side as approaching the rear end side.

With such a configuration, the good chip-discharging properties can be shown while providing an improvement of the rigidity of the holder 3.

(Fourth Embodiment)

A tool 1 (hereinafter referred to as tool 1) according to a fourth embodiment of the present invention is described in detail below with using FIGS. 5 to 8.

The tool 1 of the present embodiment has features at the second wall surface portion of the holder 3. The second wall surface portion 8 intersects with a surface portion that is located on the upper side within the outer peripheral surface of the holder 3. That is, the second wall surface portion 8 comprises an upper end portion 11 at the intersection with a surface portion that is located on the upper side within the outer peripheral surface of the holder 3. In the present embodiment, although the first wall surface portion is provided, this configuration may be similar to the first to third embodiments, for example. The first wall surface portion will be described below.

As shown in FIG. 5A, the second wall surface portion 8 comprises a first region 811 on the front thereof and, on the rear end side of the first region 811, a second region 812 that is provided along a holder axis L. As shown in FIG. 5B, the first region 811 is provided with an inclination so to get closer to the holder reference surface 5 as approaching the rear end, as viewed from the side surface. As shown in FIG. 6B, at a cross-section perpendicular to the axis L of the holder, the second region 812 is provided with an inclination so as to leave from the holder reference surface 5 as approaching the outer peripheral surface 4B. In the present specification, as shown in FIG. 1B, the holder reference surface 5 is a surface that provides a reference surface if the cutting tool 1 is attached on an external device and is provided on the upper side of the insert 2. That is, the holder reference surface 5 is a surface that is utilized for positioning the holder when attaching it on an external device. In the present embodiment, as shown in FIG. 1B, the holder reference surface 5 is a surface that extends toward the rear end side along the axis of the holder 3. In addition, the phrase "as viewed from a planar surface" refers to a state of viewing from the upper surface side of the insert 2 in the direction perpendicular to the holder reference surface 5.

In a planar view, the first region 811 and the second region 812 are provided so as to satisfy the following relationships.

As shown FIG. 5A, as viewed from the planar surface, the angle between the axis L of the holder and a virtual extended line N811 of the upper end portion 11 of the first region 811 is defined as $\theta 811$. The angle between the axis L of the holder and a virtual extended line of the upper end portion 11 of the second region 812 is defined as $\theta 812$. As shown in the present embodiment, if the first region 811 is provided with a curve as described below, $\theta 811$ can be the angle between the tangential line on the front side of the upper side end portion 11 of the first region 811 and the axis L of the holder. The relationship of $\theta 811 > \theta 812$ is satisfied. $\theta 812 \approx 0$ because the upper end portion 11 of the second region 812 is substantially parallel to the axis L of the holder as viewed from the planar surface. The form in which the upper end portion 11 of the second region 812 is inclined with respect to the axis L of the holder will be described below with using FIGS. 12 and 13.

The tool 1 comprises the first region and the second region that satisfy the relationship of $\theta 811 > \theta 812$ as described above, and therefore, chips generated by the cutting tool 21 are transferred smoothly to the second region 812 that is located on the outer peripheral surface 4B side along the first region 811 that is inclined so as to be located on the upper side as approaching the rear end as viewed from the side surface and is provided with an inclination with respect to the outer peripheral surface 4B with the angle $\theta 811$ as viewed from a planar surface. Then, the chips that approach this second region 812 are discharged outside of the tool 1 because the second region 812 is provided along the axis L of the holder and provided with an inclination so as to be located on the lower side as approaching the outer peripheral surface 4B in a cross-section perpendicular to the axis L of the holder. Accordingly, the clogging of chips between the workpiece and the front surface 31 of the holder 3 can be constrained. As a result, it is possible to constrain both the scratching of chips against the machined wall surface and the deterioration of the machining accuracy.

$\theta 811$ is preferably between 50 degrees and 80 degrees and $\theta 812$ is preferably between 0 degree and 15 degrees. The result of $\theta 811 - \theta 812$ is preferably between 50 degrees and 80 degrees. In the present embodiment, $\theta 811$ is 70 degrees and $\theta 812$ is approximately 0 degree.

As shown FIG. 6A, at a cross-section perpendicular to the axis L of the holder, the first region 811 is provided with an inclination so as to leave from the holder reference surface 5 as approaching the outer peripheral surface 4B. The first region 811 forms a concave-curved surface shape in the cross-section perpendicular to the axis L of the holder. In addition, as shown in FIG. 5A, the first region 811 intersects with the outer peripheral surface 4B as viewed from the planar surface and is convexly curved toward the outer peripheral surface 4B side. That is, the first region 811 of the second wall surface portion 8 forms a convex shape toward the outside in a cross-section parallel to the holder reference surface 5 described below.

Accordingly, chips can be discharged along the second wall surface portion 8 while ensuring the rigidity of the holder 3. That is, a wider space can be ensured between the workpiece and the second wall surface portion 8 and chips can be discharged smoothly to the outer peripheral surface 4B side. Therefore, the clogging of chips can be constrained. As a result, the finished-surface accuracy can be improved.

In particular, elongated chips can be discharged stably to the outer peripheral surface 4B side along the second wall surface portion 8 even if chips that are elongated easily are generated due to the higher ductility of the workpiece.

The first region 811 forms a concave-curved surface shape as viewed also from the side surface. Accordingly, chips are discharged more smoothly along the first region 811. As a result, the effect of constraining the clogging of chips between the front surface 31 of the holder 3 and a workpiece is increased.

As shown in FIG. 5A, the upper end portion 11, which is an intersection ridge of the first region 811 and the outer peripheral surface of the holder 3, forms a substantially circular-arc shape. In the present embodiment, as viewed from the planar surface, the front side of the intersection ridge forms a circular-arc shape. The chord X of the circular-arc is substantially parallel to a bisector m of the insert 2, such as a bisector that connects the front of the cutting edge 21, for example.

The chips generated by the cutting edge 21 pass through over the rake surface of the insert 2 along the bisector m according to the cutting conditions, as viewed from the planar surface.

In the present embodiment, the chord X of the circular arc is substantially parallel to the bisector m, and the first region 811 is provided along the discharging direction of the chips. As a result, the effect of stably discharging the chips toward the outer peripheral surface 4B side along the second wall surface portion 8 having the first region 811 is increased.

In the present embodiment, the chord X of the circular arc may be inclined relative to the inclination of the bisector m such that the chord X gets closer to the outer peripheral surface 4A as approaching the rear end.

In such a form, the chips generated by the cutting edge 21 can be discharged smoothly to the outer peripheral surface 4B side, as well.

Figure 7:
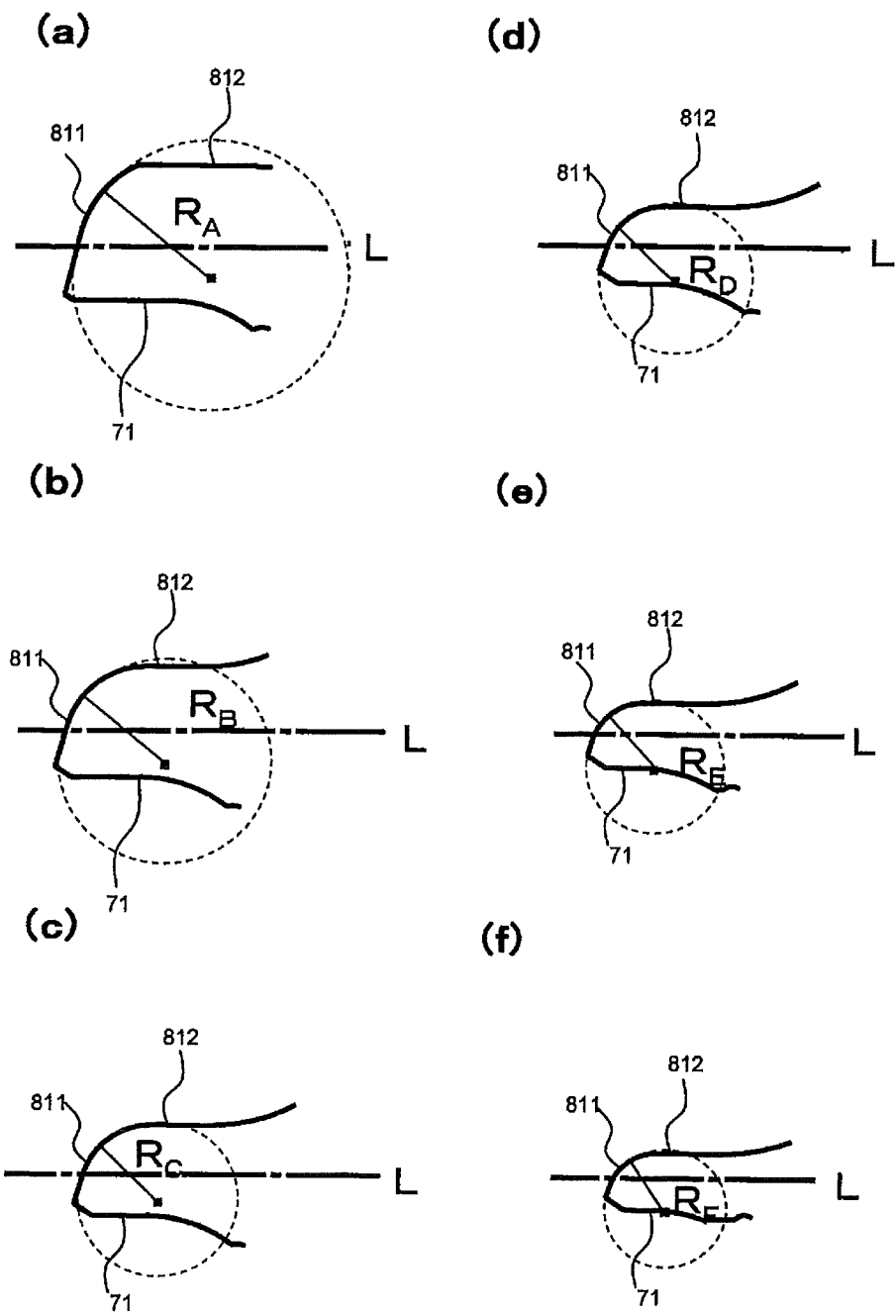
FIG. 7A is a cross-sectional view from the A-A line.
FIG. 7B is a cross-sectional view from the B-B line.
FIG. 7C is a cross-sectional view from the C-C line.
FIG. 7D is a cross-sectional view from the D-D.
FIG. 7E is a cross-sectional view from the E-E line.
FIG. 7F is a cross-sectional view from the F-F line, all shown in FIG. 5B.

FIG. 7 shows cross-sectional views from the A-A line through the F-F line, which are parallel to the holder reference surface 5, shown in FIG. 5B. These cross-sectional views are located at regular intervals from each other. According to the present invention, in this plurality of cross-sections, the curvature radius R of the first region 811 decreases as approaching the upper side.

With such a configuration, the rigidity of the holder 3 can be increased while ensuring a wider opening area of the chip pocket 8. As a result, the effect of improving both the chip-discharging properties and the rigidity of the holder 3 is increased.

Figure 8:
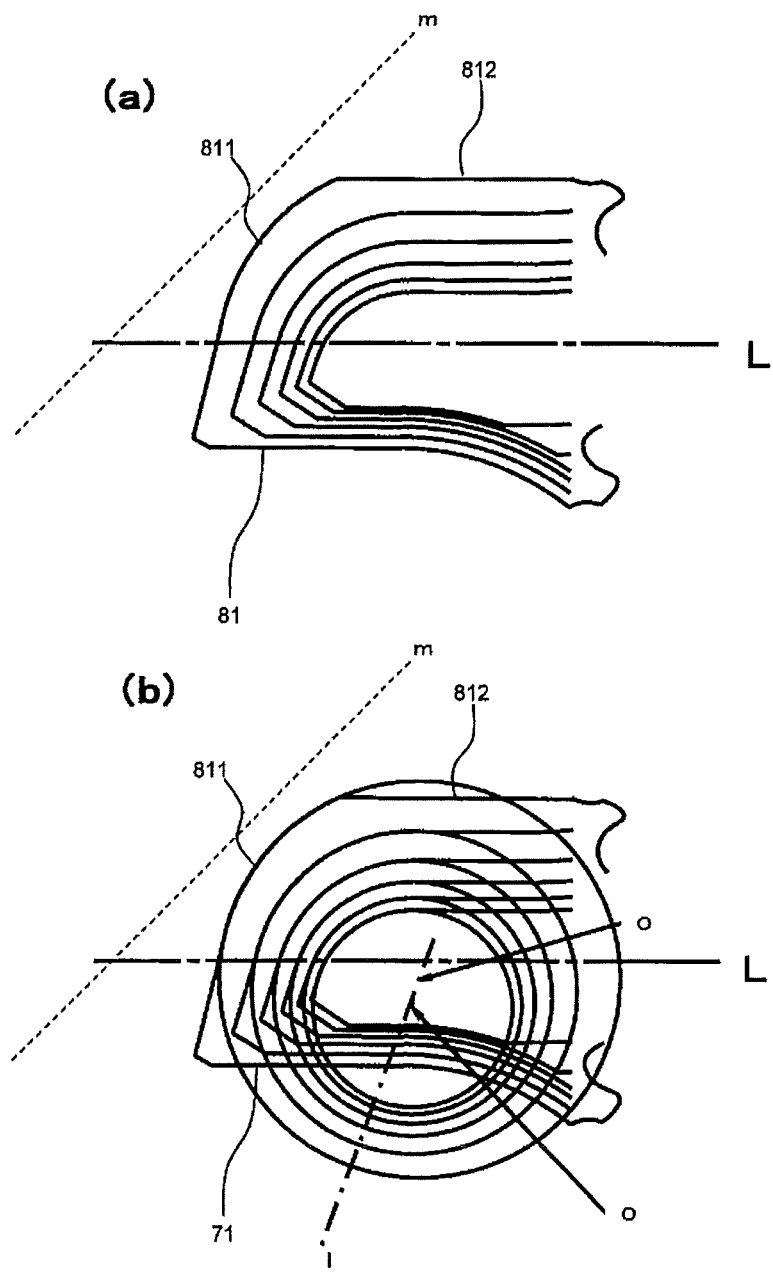
FIGS. 8A and 8B combined FIGS. 7A to 7F for a rough explanation.

Furthermore, as shown in FIGS. 7 and 8, in such a plurality of cross-sections, a center O of the curvature radius R of the first region 811 is located on the outer peripheral surface 4A side as approaching the upper side.

With such a configuration, in the lower side that is adjacent to the cutting edge 21 within the chip pocket, the width of the chip pocket 8 becomes wider and the inclination of the first region 811 becomes gentler along the radial direction. As a result, the effect of stably discharging chips toward the outer peripheral surface 4B side is increased while securing the rigidity of the holder 3.

As shown in FIG. 8B, in such a plurality of cross-sections, the center O of the curvature radius R of the first region 811 is located on the front side as approaching the upper side.

With such a configuration, on the lower side that is adjacent to the cutting edge within the chip pocket, the width of the chip pocket 8 becomes wider and the inclination of the first region 811 becomes gentler along the direction of the axis L of the holder 3. As a result, the effect of stably discharging chips toward the outer peripheral surface 4B side is increased while securing the rigidity of the holder 3.

In the present embodiment, as shown in FIGS. 7 and 8, a form in which the center O of the curvature radius R of the first region 711 is located on the outer peripheral surface 4A side and the front side as approaching the upper side is now illustrated. With such a configuration, chips generated by the cutting edge 21 is discharged smoothly when being discharged substantially along the bisector m.

The embodiment of the cutting tool according to the present invention is not limited to this form. For example, it may be a form in which the center O of the curvature radius R of the first region 811 is located on the outer peripheral surface 4A as approaching the upper side and, in the direction along the radial direction of the holder 3, the center is located on the same position. As another embodiment, it may be a form in which the center O of the curvature radius R of the first region 811 is located on the front side as approaching the upper side, while in the direction along the radial direction of the holder 3, the center is located on the same position.

As shown in FIG. 8B, the center O of the curvature radius R of each cross-section of the first region 811 is located on a straight line I. In addition, compared to the bisector m of a corner portion 22 of the insert 2, the straight line I is inclined so as to leave the outer peripheral surface 4A as approaching the rear end.

With such a configuration, the opening region of the chip pocket is widened. Therefore, an uppermost end t that is located nearest to the holder reference surface 5 side within the upper end portion 11 can be provided further toward the front side while ensuring the rigidity of the holder 3. Accordingly, chips can be discharged smoothly toward the outer peripheral surface 4B side while ensuring the rigidity of the holder 3.

Even if the straight line I is substantially parallel to the bisector m, the chip-discharging properties can be improved while ensuring the rigidity of the holder 3. In terms of ensuring a wider opening area of the chip pocket, the straight line I is preferably inclined compared to the bisector m as described above.

As shown in FIGS. 7 and 8, in addition, the center O of the curvature radius R of the second wall surface portion 8 is located on the outer peripheral surface 4A side with respect to the axis L or the holder 3. Accordingly, a wider chip pocket can be ensured in the radial direction of the holder 3. As a result, the effect of smoothly discharging chips will be increased.

Furthermore, in the present embodiment, the chip pocket comprising the second wall surface portion 8 also opens to the front surface 31 of the holder 3. That is, the second wall surface portion 8 intersects with the front surface 31 of the holder 3. With such a configuration, the retaining of chips at the front side of the chip pocket can be constrained. As a result, the effect of more stably discharging chips to the outer peripheral surface 4B side is increased.

In the present embodiment, the chip pocket comprising the second wall surface portion 8 opens over the entire radial length in the region located on the outer peripheral surface 4B side relative to the insert pocket 6 within the front surface of the holder 3. That is, the upper end portion of the front surface of the holder 3 consists of a region intersecting with the second wall surface portion 8 and a region intersecting with the insert pocket 6. Cutting tools according to the present invention are not limited to this embodiment. The second wall surface portion 8 may be a form that does not intersect with the front surface 31 of the holder 3 or a form that intersects with a portion of the front surface 31 of the holder 3.

In the cross-section that passes through the uppermost end t of the second wall surface portion 8 and is perpendicular to the axis of the holder as shown in FIG. 6A, an angle $\theta 1$ between the second wall surface portion 8 and a line parallel to the holder reference surface 5 at the upper end portion 11 of the second wall surface portion 8 is an obtuse angle.

Such a configuration can result in providing a wider chip pocket 7 as well as ensuring the rigidity of the holder.

Moreover, in a cross-section that passes through the uppermost end t of the second wall surface portion 8 and is perpendicular to the axis L of the holder 3, a rising angle $\theta 2$ at a lower end portion 12 of the second wall surface portion 8 is positive.

The angle θ2 is further an acute angle. Accordingly, chips are curled along the chip pocket 7, and inversion of the chips to the front side of the holder 3 can be constrained. As a result, the clogging of chips at the chip pocket 7 can be constrained.

The rising angle θ2 as used herein refers to, in the above-mentioned cross-section, the angle between the tangential line of the second wall surface portion 8 and a line parallel to the holder reference surface 5 at the lower end portion 12.

As shown in FIG. 5B, an angle θ3 between the second wall surface portion 8 and the outer peripheral surface 4 of the holder 3 at the upper end portion 11 of the second wall surface portion 8 is an obtuse angle as viewed from the side surface. Accordingly, the rigidity of the holder 3 is increased and curling and inversion of chips along the chip pocket 7 can be constrained. As a result, the clogging of chips at the front side of the holder 3 can be constrained while ensuring the rigidity of the holder 3.

The angle θ3 as used herein refers to the angle between the tangential line of the second wall surface portion 8 and the outer peripheral surface 4 of the holder 3 at the upper end portion 11 of the second wall surface portion 8 as viewed from the side surface.

As shown in FIG. 5B, a rising angle θ5 of the second wall surface portion 8 at the lower portion 12 of the second wall surface portion 8 is smaller than a rising angle θ4 of the second wall surface portion 8 at the upper end portion 11 of the second wall surface portion 8 as viewed from the side surface. Accordingly, the rigidity of the holder can be ensured and the chip-discharging properties can be improved. That is, since the second wall surface portion 8 is gentler at the lower side that is adjacent to the cutting edge 21, the second wall surface portion 8 can come into contact smoothly with chips. Therefore, frictional resistance between the chips and the second wall surface portion 8 can be reduced. As a result, the chip-discharging properties can be improved due to the reduction of frictional resistance while ensuring the rigidity of the holder 3.

The angle θ4 as used herein refers to the angle between the tangential line of the second wall surface portion 8 and a line parallel to the holder reference surface 5 at the upper end portion 11 of the second wall surface 8. Similar to the angle θ4, the angle θ5 refers to the angle between the tangential line of the second wall surface portion 8 and a line parallel to the holder reference surface 5 at the lower end portion 12 of the second wall surface portion 8.

The chip pocket comprising the second wall surface portion 8 comprises a third region 813 that is located on the front side relative to the first region 811. The third region 813 connects to the insert pocket 6. The third region 813 forms a flat surface that is located on the upper side as approaching the rear end side. Accordingly, chips generated by the cutting edge are discharged along the third region 813. As a result, the direction of discharge of the chips is stabilized and chips can be discharged smoothly toward the outer peripheral surface 4B side.

The third region 813 connects over the entire radial length of the rear end portion of the insert pocket 6. That is, as shown in FIG. 5A, a width w812 on the front side of the third region 813 is substantially equal to a width w6 on the rear end side of the insert pocket 6. The widths w812, w6 as used herein refer to the dimensions of each configuration in the radial direction of the holder 3 as viewed from the planar surface.

With such a configuration, the chips can be led stably toward the second wall surface portion 8. As a result, the effect of discharging chips smoothly toward the outer peripheral surface 4B side is increased.

As shown in FIG. 5B, a rising angle θ6 of the third region 813 at the upper end portion 11 of the third region 813 is greater than the rising angle θ5 at the lower end portion of the second wall surface portion 8 as viewed from the side surface. Accordingly, an opening portion for a supply hole for cutting fluid can be provided on the third region 813. Therefore, the cutting fluid can be appropriately supplied around the cutting edge 21. As a result, temperature increases of the cutting edge during cutting can be effectively constrained.

Also, similar to abovementioned angles θ4, θ5, the angle θ6 as used herein refers to the angle between the tangential line of the third region 813 and a line parallel to the holder reference surface 5 at the lower end portion of the third region 813 as viewed from the side surface.

As described above, in the present embodiment, the second region 812 that is located on the rear end side relative to the first region 811 is provided so as to extend substantially parallel to the axis L of the holder 3 as viewed from the planar surface. That is, θ812≈0. Accordingly, a wider chip pocket 7 can be provided while ensuring the rigidity of the holder 3. As a result, good chip-discharging properties can be shown even with a machining form in which it is difficult to ensure a wider chip-discharging space, such as when machining an inner wall surface of a workpiece that is deep inside from the end surface of the workpiece. The upper end portion 11 of the second region 812 is located on the outer peripheral surface 4B side with respect to the axis L of the holder 3.

The second wall surface portion 8 is located on the front side of the first region 811 and comprises a fourth region 814 that intersects with the front surface 31 of the holder 3. The fourth region 814 is arranged so as to be substantially parallel to the holder reference surface 5. With such a configuration, a wider opening region toward the outside of the front side of the holder 3 can be ensured.

As shown in FIG. 5B, the first region 811 is located on the holder reference surface 5 side relative to the cutting edge 21. In addition, the boundary portion between the first region 811 and the fourth region 814 is located on the front side relative to the rear end of the insert pocket 6. With such a configuration, the boundary portion is formed on the front side relative to a corner portion with an acute angle that is not involved in cutting and is positioned on the rear end side among two corner portions having acute angles. Therefore, the fourth region 814 is arranged on the front surface 31 side of the holder 3, and the first region 811 is arranged on the periphery of the corner portion having an acute angle on the rear end side where large stress is easily concentrated during cutting. Accordingly, a wider opening region on the front side of the holder 3 can be secured, and a thicker wall thickness of the holder 3 on the periphery of the corner portion having an acute angle on the rear end side can be maintained. As a result, good chip-discharging properties can be ensured and chipping of the holder 3 can be constrained.

On the other hand, the chip pocket that configures the first wall surface portion 7 is located on the rear end side of the insert pocket 6 and, in the present embodiment, the first wall surface portion 7 is also connected to the insert pocket 6. In this way, the first wall surface portion 7 intersects with both the insert pocket 6 and the outer peripheral surface 4A of the holder 3 in the present embodiment. With such a configuration, good chip-discharging properties can be provided even under cutting conditions in which a plurality of chips with different shapes is generated.

Specifically, the first wall surface portion 7 can, with such a configuration, ensure a space for discharging short chips that are minutely divided in the longitudinal direction at a relatively early stage toward the outer peripheral surface 4A side. Therefore, chips of a short length can be discharged smoothly to the outer peripheral surface 4B side. As a result, the pinching of chips on the outer peripheral surface 4A side and the retaining of chips on the outer peripheral surface 4B side can be constrained. The first wall surface portion 7 comprises a fifth region 715 where an upper end portion 14 extends substantially parallel to the axis L of the holder as viewed from the planar surface. Accordingly, both rigidity and a space for discharging to the outer peripheral surface 4A side can be ensured.

In the present embodiment, the upper end portion 11 of the second region 812 of the second wall surface portion 8 and the upper end portion 14 of the fifth region 715 of the first wall surface portion 7 are provided so as to be substantially parallel to each other as viewed from the planar surface. In the present embodiment, the upper end portion 11 of the second region 812 and the upper end portion 14 of the fifth region 715 are both arranged substantially parallel to the axis L of the holder. Accordingly, it will be a form that ensures at least a certain cross-sectional area of the ridge of the holder 3, which is surrounded by the second wall surface portion 8 and the first wall surface portion 7 that most greatly affect the rigidity. As a result, a wider space in which chips are discharged can be ensured without significantly decreasing the rigidity.

In particular, since the second wall surface portion 8 and the first wall surface portion 7 comprise such a region in which they are parallel to each other, the biting of chips between the work piece and the outer peripheral surface 4 of the holder 3 can be constrained even in cases of machining a deep hole. As a result, stable chip-discharging properties can be shown even if a deep hole is machined.

The second region 812 of the second wall surface portion 8 is located on the rear end side relative to the fifth region 715 of the first wall surface portion 7. With such a configuration, reductions of the ridge of the holder 3 can be constrained. On that basis, the circular arc of the upper end portion 11 of the first region 811 can be increased, a wider opening region of the chip pocket having the second wall surface portion 8 can be ensured along with a wider opening region of the front side of the chip pocket having the first wall surface portion 7. As a result, both the effect of constraining chattering and the effect of smoothly discharging chips are improved.

Figure 5:
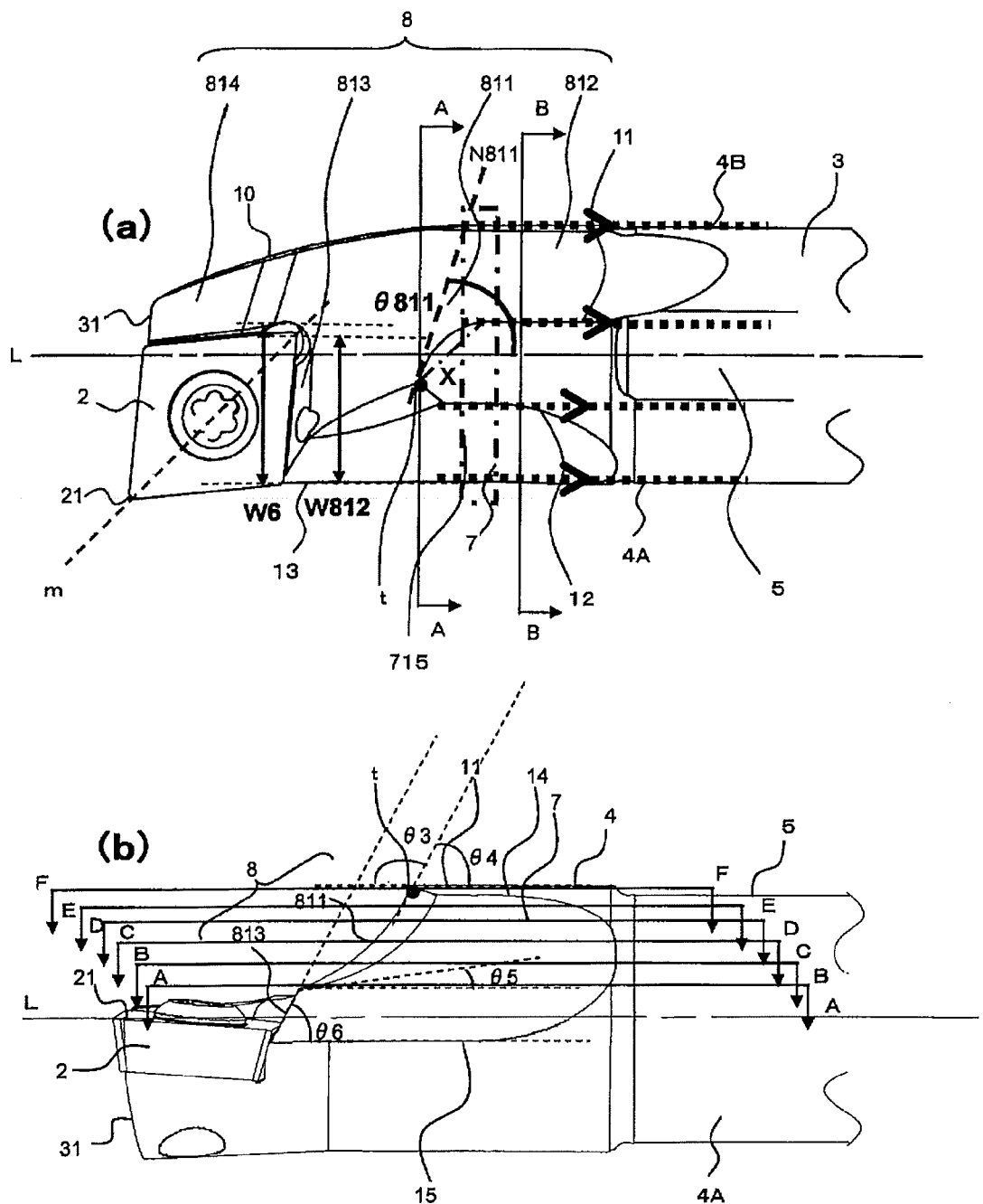
FIG. 5A is a plan view and FIG. 5B is a side view, both illustrating a cutting tool according to a fourth embodiment of the present invention.
Figure 6:
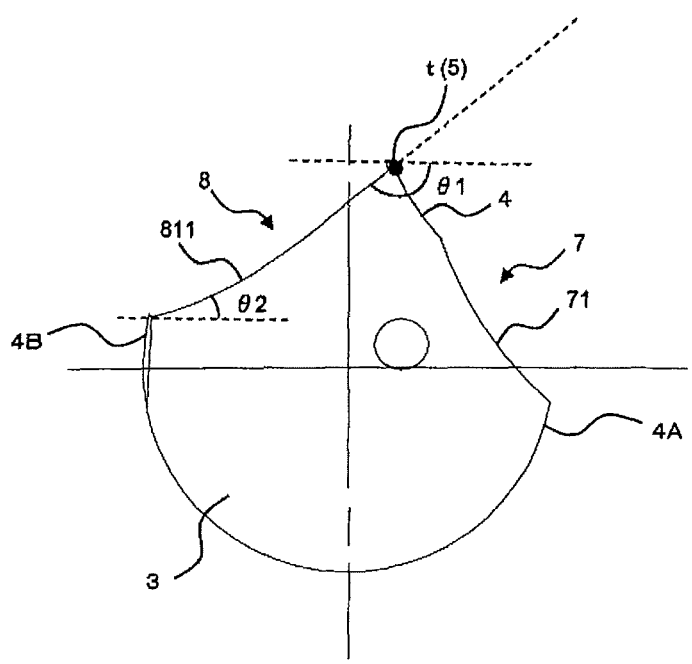
FIG. 6A is a cross-sectional view from the A-A line and FIG. 6B is a cross-sectional view from the B-B line, each shown in FIG. 5A.
Figure 6:
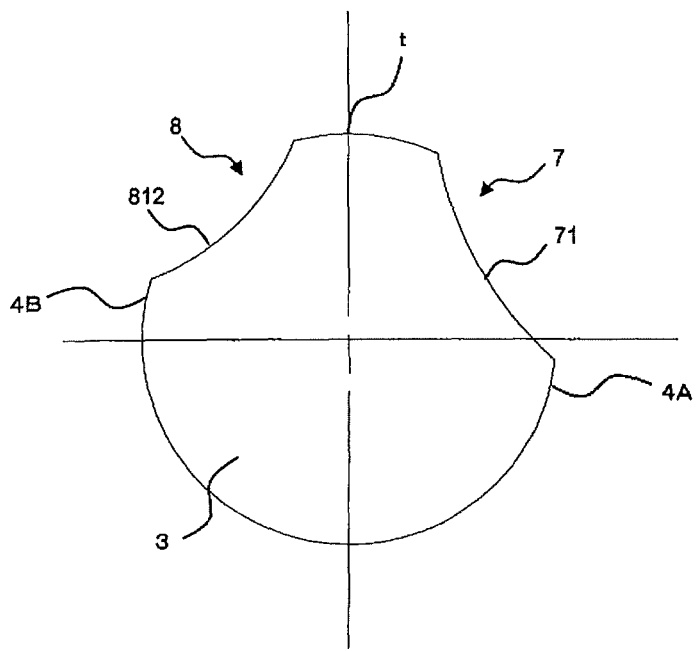

In the present embodiment, as shown in FIG. 5, the second region 812 and the fifth region 715 are provided such that at least a part of them is arranged at same position in the direction of the axis L of the holder as viewed from the planar surface. With such a configuration, the holder 3 will comprise a region in which the cross-sectional area does not vary along the axis L of the holder. Accordingly, the effect of constraining chattering that is generated during cutting will be increased.

In addition, as shown in FIG. 5, the second wall surface portion 8 is provided extending to the rear end relative to the first wall surface portion 7 as viewed form the planar surface. With such a configuration, a wide space for discharging chips that are discharged toward the outer peripheral surface 4B side during machining of the inner wall of a deeper hole can be ensured. As a result, the chips can be discharged smoothly while constraining the biting of chips.

In the present embodiment, the lower end portion 12 of the second wall surface portion 8 and the lower end portion 15 of the first wall surface portion 7 are both provided so as to be substantially parallel to the holder axis. With such a configuration, the chip-discharging properties can be improved while ensuring the rigidity of the holder 3.

Similar to the second wall surface portion 8, in the present embodiment, the first wall surface portion 7 forms a concave shape, specifically, a concave and a curved shape in the cross-section perpendicular to the axis L of the holder, as shown in FIG. 6A.

(Fifth Embodiment)

Figure 9:
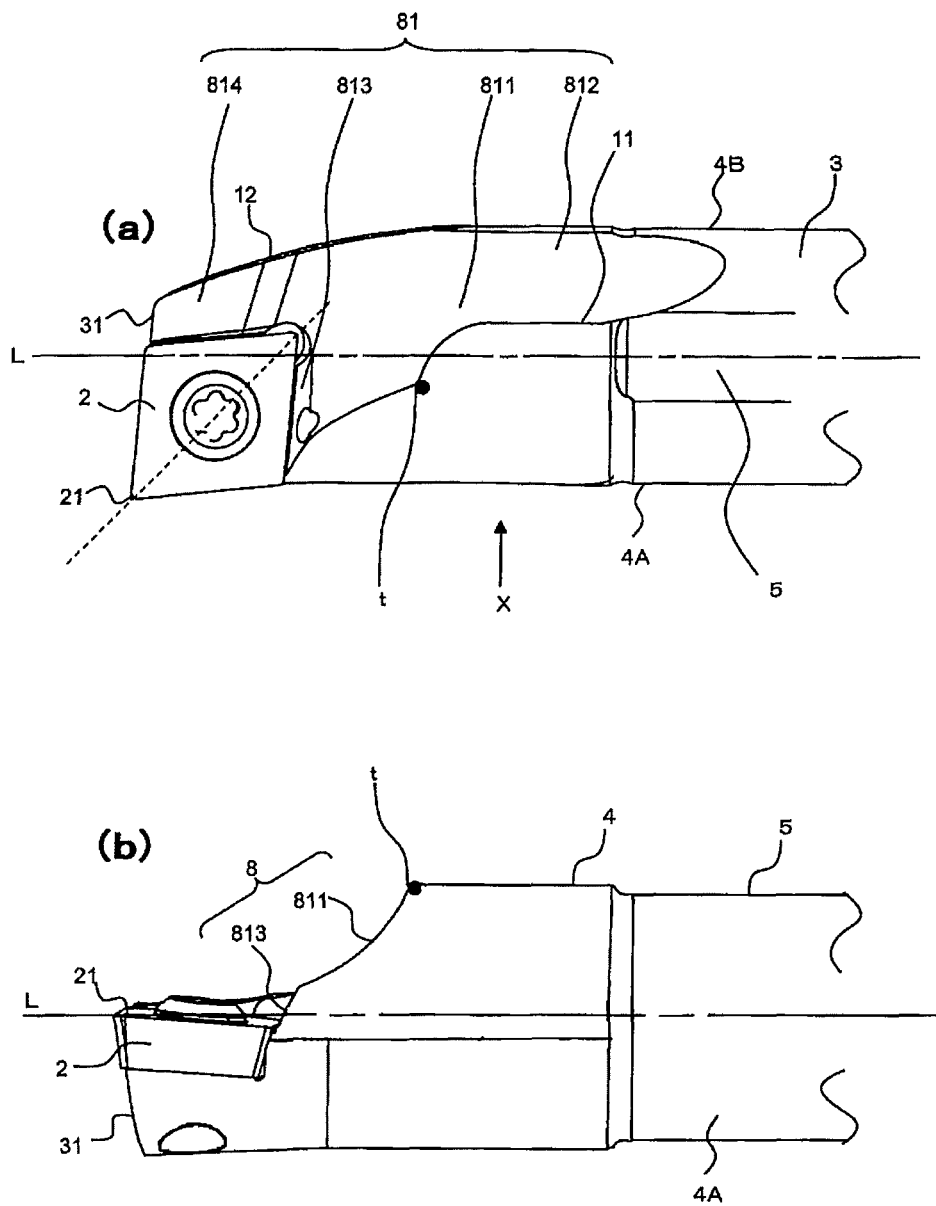
FIG. 9A is a plan view and FIG. 9B is a side view as viewed from the X-direction, both illustrating a cutting tool according to a fifth embodiment of the present invention.

A tool 1 according to a fifth embodiment of the present invention is described in detail below with using FIG. 9.

The tool 1 of the present embodiment is different from the tool of the fourth embodiment in the configuration of the holder 3.

Specifically, the holder 3 does not comprise the first wall surface portion 7. In such a form, the rigidity of the holder 3 increases. As a result, the effect of constraining the chipping and vibrating of the holder 3 during machining is further increased.

(Sixth Embodiment)

Figure 10:
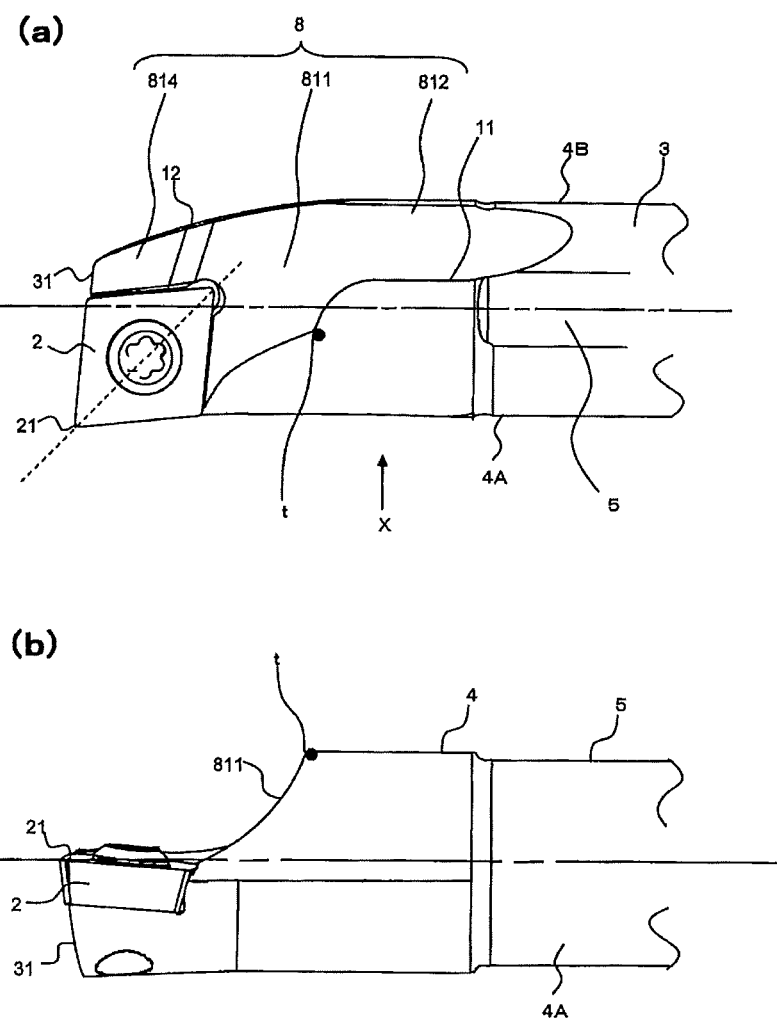
FIG. 10A is a plan view and FIG. 10B is a side view as viewed from the X-direction, both illustrating a cutting tool according to a sixth embodiment of the present invention.

A tool 1 according to a sixth embodiment of the present invention is described in detail below with using FIG. 10.

The tool 1 of the present embodiment is different from the tool of the fourth embodiment in the configuration of the holder 3.

Specifically, the holder 3 does not comprise the first wall surface portion 7 and the third region 813. That is, the insert pocket 6 connects to the first region 811 directly without going through the third region 813.

With such a configuration, the chips flowing through the rake surface can be discharged smoothly along the wall surface. As a result, the chips can be discharged appropriately toward the outer peripheral surface 4B side.

In addition, since machining of the holder 3 is facilitated, the machining costs of the holder 3 can also be decreased.

(Seventh Embodiment)

Figure 11:
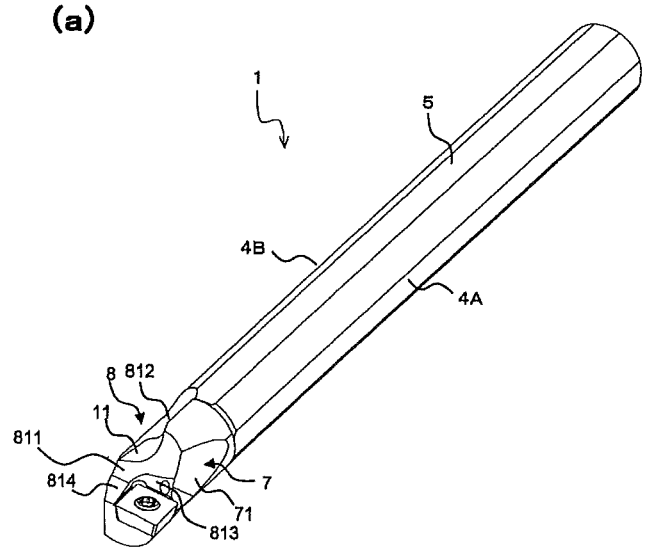
FIG. 11A is a total perspective view and FIG. 11B is a plan view, both illustrating a cutting tool according to a seventh embodiment of the present invention.
Figure 11:
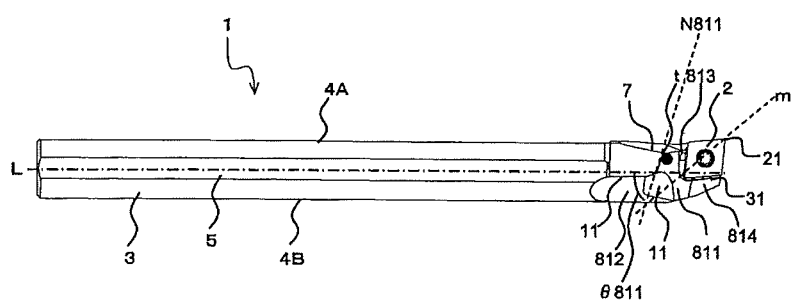

A tool 1 according to a seventh embodiment of the present invention is described in detail below with using FIG. 11.

The tool 1 of the present embodiment is different from the tool of the fourth embodiment in the shape of the second wall surface portion 8.

Specifically, as shown in FIG. 11B, the angle θ811 between the axis L of the holder and the upper end portion 11 of the first region 811 is greater than the angle θ812 between the axis L of the holder and the second region 812 as viewed from the planar surface. In the present embodiment, the second region 812 is substantially parallel to the axis L of the holder, as viewed from the planar surface.

With such a configuration, the chips generated by the cutting edge 21 can be transferred smoothly toward the second region 812 that is located on the outer peripheral surface 4B side along the first region 811 that is inclined so as to be located on the upper side as approaching the rear end as viewed from the side surface and that is inclined from the outer peripheral surface 4B with the angle θ811 as viewed from a planar surface. Then, the chips having reached the second region 812 are discharged smoothly toward the outside of the tool 1 because the second region 812 is provided along the axis L of the holder. Therefore, the clogging of chips between the workpiece and the front surface 31 of the holder 3 can be constrained. As a result, scratching of the machined wall surface by the chips can be constrained and deterioration of the processing accuracy can be constrained.

In the present embodiment, a connecting surface 13 is provided between the first region 811 and the second region 812. With such a configuration, chips can be discharged more smoothly to the outer peripheral surface 4B side in which a wider space can be ensured.

In the present embodiment, a form in which the first region 811 and the second region 812 are connected more smoothly will be the tool 1 of the first embodiment. The tool 1 according to the first embodiment is configured with a curved surface in which the first region 811 and the second region 812 are connected smoothly as described above so that the chip-discharging properties of the tool 1 according to the first embodiment can be improved further.

In the tool 1 of the present embodiment, the second wall surface portion is located on the front side of the first region 811 and comprises the fourth region 814 that intersects with the front surface 31 of the holder 3. The fourth region 814 is arranged so as to be substantially parallel to the holder reference surface 5. Accordingly, a wider opening region toward the outside of the front side of the holder 3 can be ensured.

Furthermore, the first region 811 is located on the holder reference surface 5 side relative to the cutting edge 21. In addition, the boundary portion between the first region 811 and the fourth region 814 is located on the front side relative to the rear end of the insert pocket 6. With such a configuration, the boundary portion is formed on the front side relative to a corner portion with an acute angle that is not involved in cutting and is positioned on the rear end side among two corner portions having acute angles. Therefore, the fourth region 814 is arranged on the front surface 51 side of the holder 3, and the first region 811 is arranged on the periphery of the corner portion having an acute angle on the rear end side, where large stress is easily concentrated during cutting. Accordingly, a wider opening region on the front side of the holder 3 can be secured, and a thicker wall thickness of the holder 3 on the periphery of the corner portion with an acute angle on the rear end side can be maintained. As a result, good chip-discharging properties can be ensured and damage to the holder 3 can be constrained.

(Eighth Embodiment)

Figure 12:
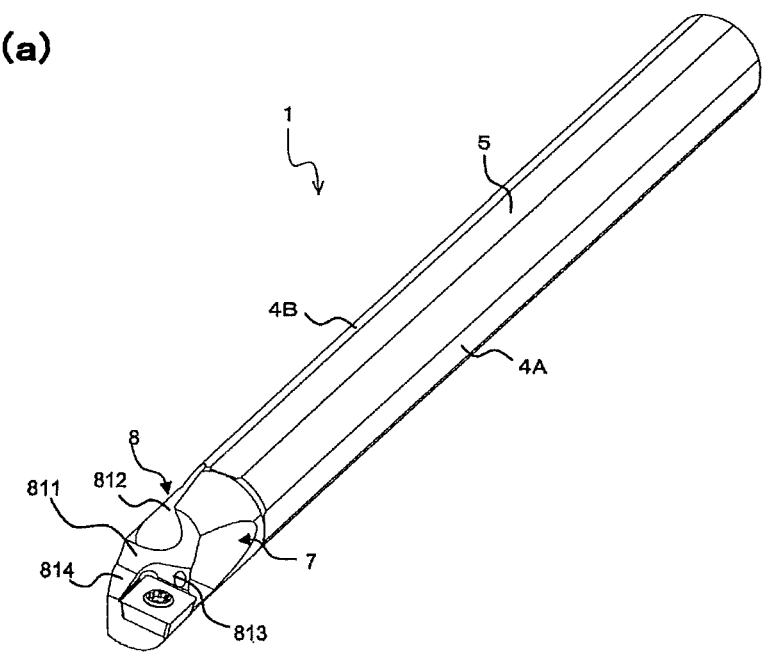
FIG. 12A is a total perspective view and FIG. 12B is a plan view, both illustrating a cutting tool according to an eighth embodiment of the present invention.
Figure 12:
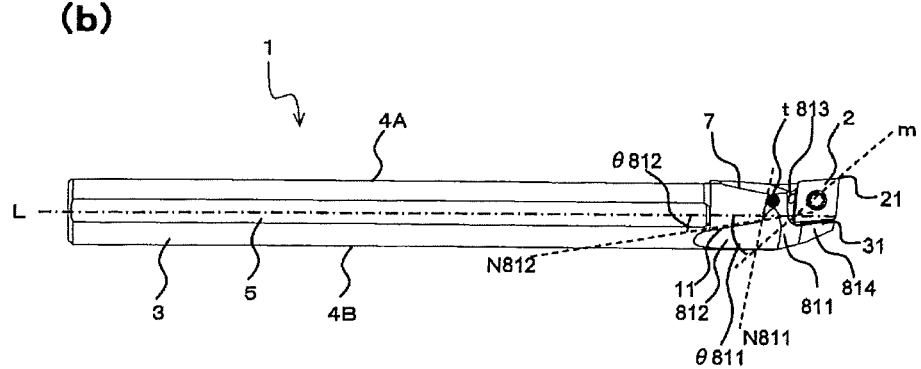

A tool 1 according to an eighth embodiment of the present invention is described in detail below with using FIG. 12.

The tool 1 of the present embodiment is different from the tool 1 of the fourth embodiment in the shape of the first region 811 and the second region 822.

On the tool 1 of the present embodiment, as shown in FIG. 12B, the second region 812 is provided so as to be inclined with respect to the axis L of the holder as viewed from the planar surface. That is, unlike abovementioned embodiment, $\theta 712 \neq 0°$. In the present embodiment, $\theta 812$ is the angle between a tangential line N812 on the front side of the upper end portion 11 of the second region 812 and the axis L of the holder. In such a form, the holder has high rigidity, and chattering generated during cutting can be reduced.

As for the tool 1 of the present embodiment, the connecting surface 13 that is located between the first region 811 and the second region 812 of the tool 1 according to the fourth embodiment is connected smoothly with the first region 811. That is, the first region 811 and the connecting surface 13 do not have a boundary portion therebetween and are formed on substantially the same surface. Therefore, in the present embodiment, the angle between the second region 812 and the first region 811 is smaller than that of the fourth embodiment. With such a configuration, since there is no edge portion generated at the intersection of the first region 811 and the connecting surface 13, the chips can be discharged more smoothly toward the chip pocket 7 side.

In the present embodiment, the upper end portion 14 of the first wall surface portion 7 is inclined with respect to the axis L of the holder as shown in the planar surface.

(Ninth Embodiment)

Figure 13:
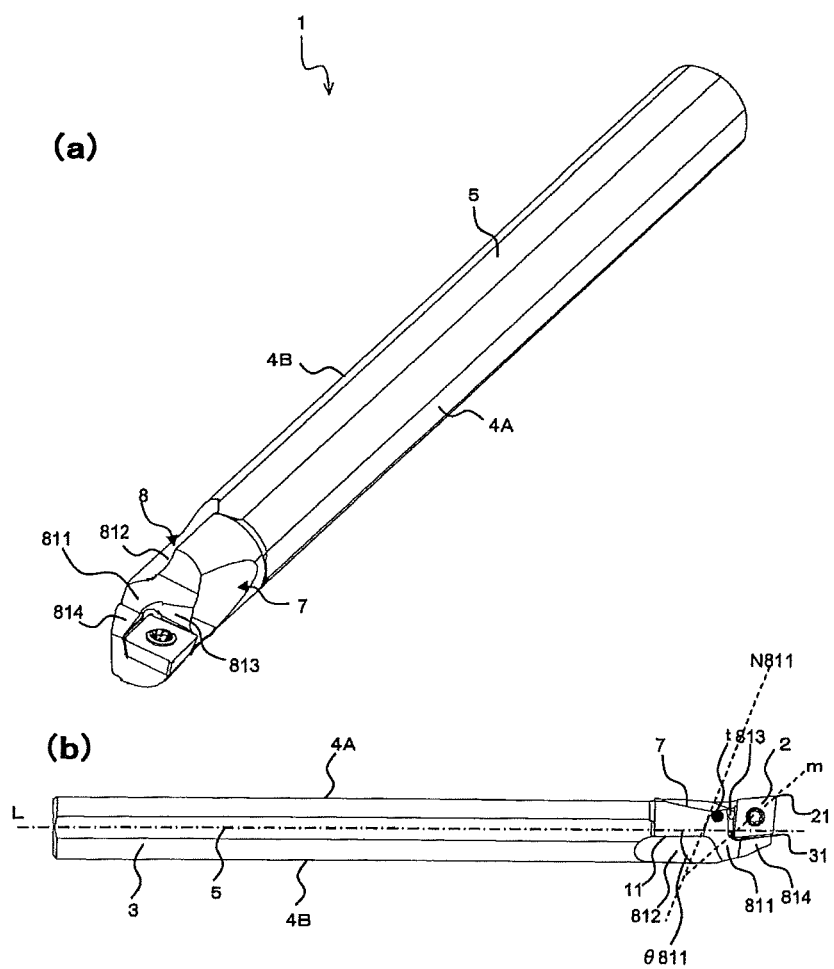
FIG. 13A is a total perspective view and FIG. 13B is a plan view, both illustrating a cutting tool according to a ninth embodiment of the present invention.

A tool 1 according to a ninth embodiment of the present invention is described in detail below with using FIG. 13.

In the present embodiment, the connecting surface is not provided between the first region 811 and the second region 812. In such a form, as shown in FIG. 13B, since the above-mentioned $\theta 811 > \theta 812$ is satisfied as viewed from the planar surface, good chip-discharging properties can be shown.

In the present embodiment, the upper end portion 11 of the second wall surface portion 8 comprises a region that is substantially parallel to the axis L of the holder. On the other hand, the upper end portion 14 of the first wall surface portion 7 is inclined with respect to the axis L of the holder (Tenth Embodiment)

Figure 14:
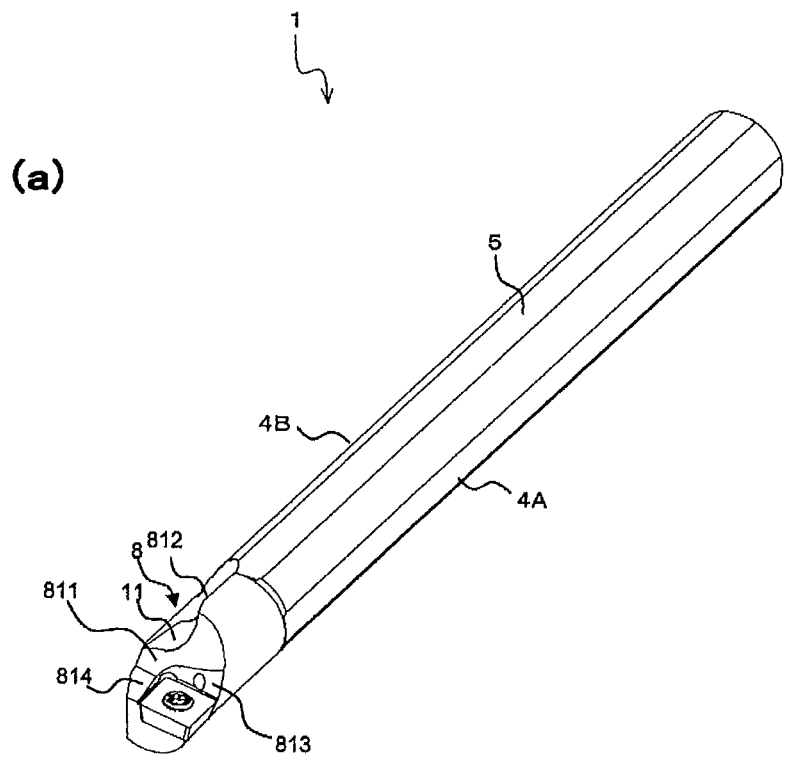
FIG. 14A is a total perspective view and FIG. 14B is a plan view, both illustrating a cutting tool according to a tenth embodiment of the present invention.
Figure 14:
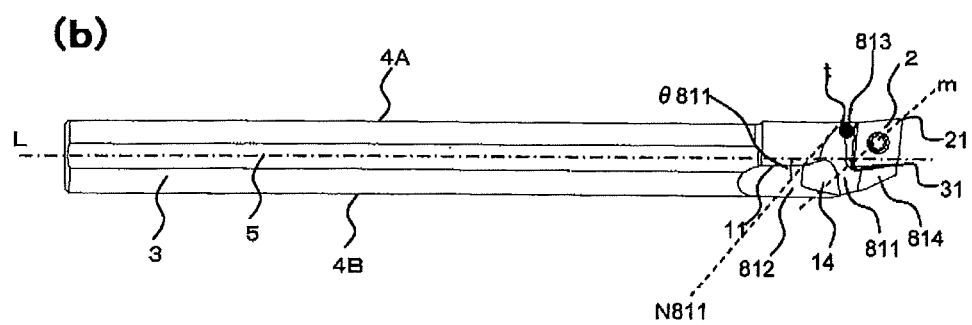

A tool 1 according to a tenth embodiment of the present invention is described in detail below with using FIG. 14.

In the present embodiment, unlike abovementioned embodiment, the first wall surface portion 7 is not provided on the outer peripheral surface 4A side. That is, in the present embodiment, the outer peripheral surface 4A side is composed of part of a substantially cylindrical surface. With such a configuration, the rigidity of the front side of the holder 3 can be increased. In particular, in the present embodiment, it is useful if the holder is used in machining forms in which a wider chip-discharging space can be ensured on the outer peripheral surface 4B side because both good chip-discharging properties and holder rigidity can be provided.

In this way, in the form in which the first wall surface portion 7 is not provided on the outer peripheral surface 4A side, the second wall surface portion 8 is preferably provided so that the upper end portion 11 of the second wall surface portion 8 becomes substantially parallel to the axis L of the holder as viewed from the planar surface because the high rigidity of the holder 3 can be maintained. Accordingly, the chip discharging properties can be improved while ensuring the rigidity of the holder 3.

(Eleventh Embodiment)

An eleventh embodiment of the present invention is described with using figures.

Figure 15:
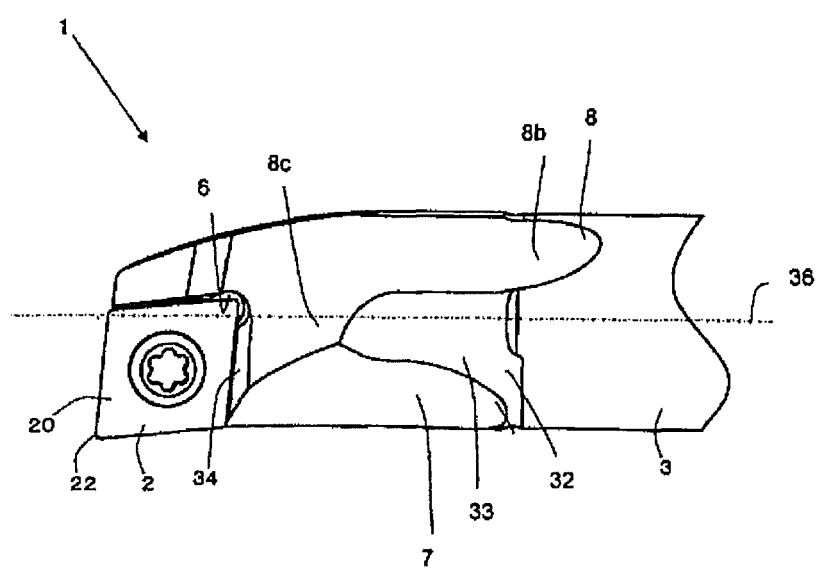
FIG. 15 is a plan view illustrating a cutting tool according to an eleventh embodiment of the present invention.

As shown in FIG. 15, the cutting tool 1 comprises a cutting insert 2 and a holder.

The holder 3 comprises a land portion 32 on the rear end side relative to the insert pocket 6 (cutting insert 2). This land portion 32 comprises the first wall surface portion 7 that extends from the front side of the holder 3 (hereinafter simply referred to as "front side") to the rear end side of the holder 3 (hereinafter simply referred to as "rear end side") and the second wall surface portion 8 that extends from the front side to the rear end side. In addition, the second wall surface portion 8 includes a concave groove 8b and a curved surface 8c that is smoothly connected to the concave groove 8b, and comprises an upper surface 33 of the land portion that connects to the three surfaces of the first wall surface portion 7, the concave groove 8b and the curved surface 8c.

The first wall surface portion 7 is formed on the outer peripheral side from which the cutting edge 22 protrudes as viewed from the front surface, and the concave groove 8b of the second wall surface portion 8 is formed on the outer peripheral side that is located on the radially opposite side from the cutting edge 22. The curved surface 8c is located on the front side relative to the concave groove 8b and is a curved surface that gets closer to the first wall surface portion 7 as leaving the concave groove 8b toward the front side of the holder 3. The concave groove 8b and the curved surface 8c configure one piece of a smooth concave-curved surface with respect to the outermost diameter of the holder 3.

In the eleventh embodiment, the first wall surface portion 7 functions as a first concave-curved surface (concave-curved surface with respect to the outermost diameter of the holder 3). The concave groove 8b and the curved surface 8c function as a second concave-curved surface. The first concave-curved surface forms a first chip pocket, and the second concave-curved surface forms a second chip pocket. The first chip pocket opens toward the outer peripheral side from which the cutting edge 22 protrudes, and the second chip pocket opens toward the outer peripheral side that is located on the radially opposite side from the cutting edge 22.

The phrase "opens toward the outer peripheral side" as used in the present specification refers to a state in which a surface that forms a space formed by an opened pocket can be viewed from the outside in the outer peripheral direction of the holder. The phrase "opens toward the front side" refers to a state in which a surface that forms a space formed by an opened pocket can be viewed from the front side of the holder. In the present embodiment, the surface that forms the space formed by the pocket intersects with the outer peripheral surface and the front surface.

A rising surface 34 (third region 813) is provided between the insert pocket 6 and each chip pocket. The rising surface 34 connects to the first wall surface portion 7 and the curved surface 8c.

In this way, since the first concave-curved surface (first wall surface portion 7 in the present embodiment) and the second concave-curved surface (curved surface formed by the concave groove 8b and the curved surface 8c in the present embodiment) are, for example, connected by a connecting line, a surface that functions to run chips on the upper surface 33 of the land portion is not formed on the land portion. For this reason, minutely divided chips are easily drawn into the first chip pocket and longer chips are easily drawn into the second chip pocket without being divided, and the chip-discharging property can thus be improved.

(Twelfth Embodiment)

Figure 16:
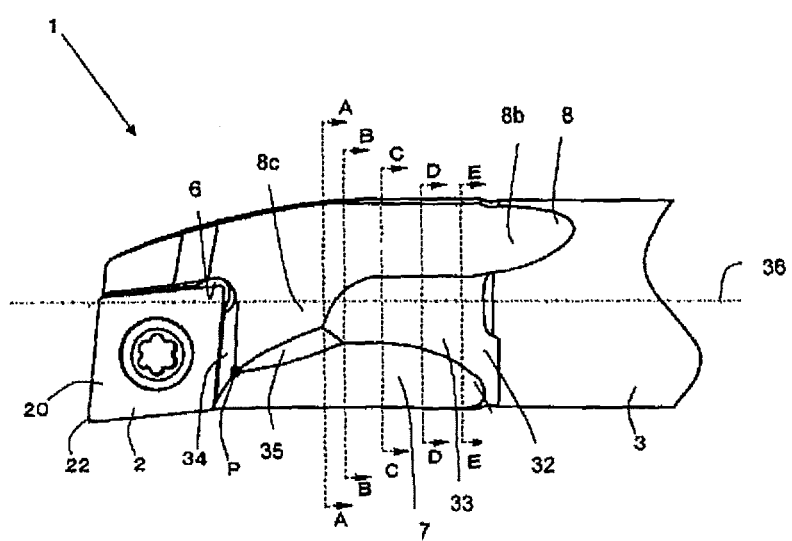
FIG. 16 is a plan view illustrating a cutting tool according to a twelfth embodiment of the present invention.
Figure 17:
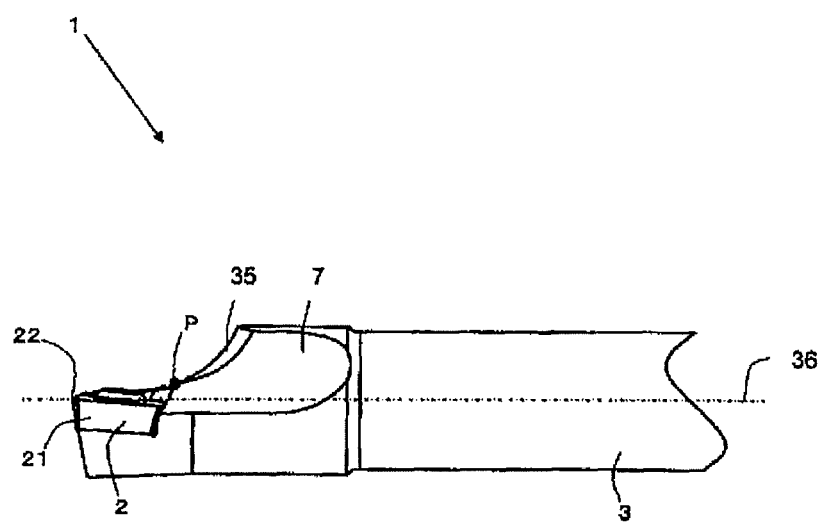
FIG. 17 is a side view illustrating a cutting tool according to a twelfth embodiment of the present invention.

A cutting tool of a twelfth embodiment according to the present invention is described with using FIGS. 16 and 17. In the twelfth embodiment, a connecting surface 35 for connecting the curved surface 8c and the first wall surface portion 7 is provided.

The rising surface 34 connects to the wall surface of the insert pocket 6, the first wall surface portion 7, the curved surface 8c, and the connecting surface 35.

As a feature of the present embodiment, on the front side, the connecting surface 35 comprises a region in which the width in the direction orthogonal to the axis of the holder (hereinafter simply referred to as "width") is widened as approaching from the front side toward the rear end side as viewed from the planar surface. The center portion of the connecting surface 35 is formed into a concave shape that is hollowed toward the inside of the holder 3 relative to the connecting portion of the first wall surface portion 7 and the curved surface 8c.

First, since the connecting surface 35 comprises the above-mentioned region, chips run on the connecting surface 35. Then, since the center portion of the connecting surface 35 is formed into a concave shape that is hollowed toward the inside of the holder 3 relative to the connecting portion of the first wall surface portion 7 and the curved surface 8c, the chips running on the connecting surface 35 are directed toward either the first chip pocket or the second chip pocket. For this reason, the chip-discharging properties are improved.

In the first embodiment, in which the surface that forms the first chip pocket and the surface that forms the second chip pocket are connected, an intersection ridge by which those two surfaces are connected is formed, whereas in the second embodiment, the intersection ridge is chamfered by the connecting surface 35.

If there is the abovementioned intersection ridge, chips may bump into the intersection ridge and be retained on the intersection ridge. Newly generated chips bump into these retained chips and are also retained. If this situation is repeated, the cutting edge 22 may bite the chips.

In contrast, in the second embodiment, in which the intersection ridge is chamfered, the chips will not be retained on the connecting surface 35 and the chips can be drawn into the chip pocket. In the present embodiment, since the connecting surface 35 approaches the rear end side as approaching the first wall surface portion 7 side from the curved surface 8c side, the chips can be drawn into the first chip pocket.

Therefore, in the present embodiment, since the biting of chips at the cutting edge 22 can be constrained, the chip-discharging properties during cutting can be further improved.

Although the connecting surface 35 forms a triangular shape as viewed from the planar surface in the twelfth embodiment, in other embodiments, the shape of the connecting surface 35 may be a polygonal shape other than a triangular shape as viewed from the planar surface. Most preferably the connecting surface 35 connects smoothly to the first wall surface portion 7 and the curved surface 8c, and in such a case, since no edge is formed on the boundary portion between the first concave groove and an R surface, the chip-discharging properties during cutting can be further improved.

Figure 18:
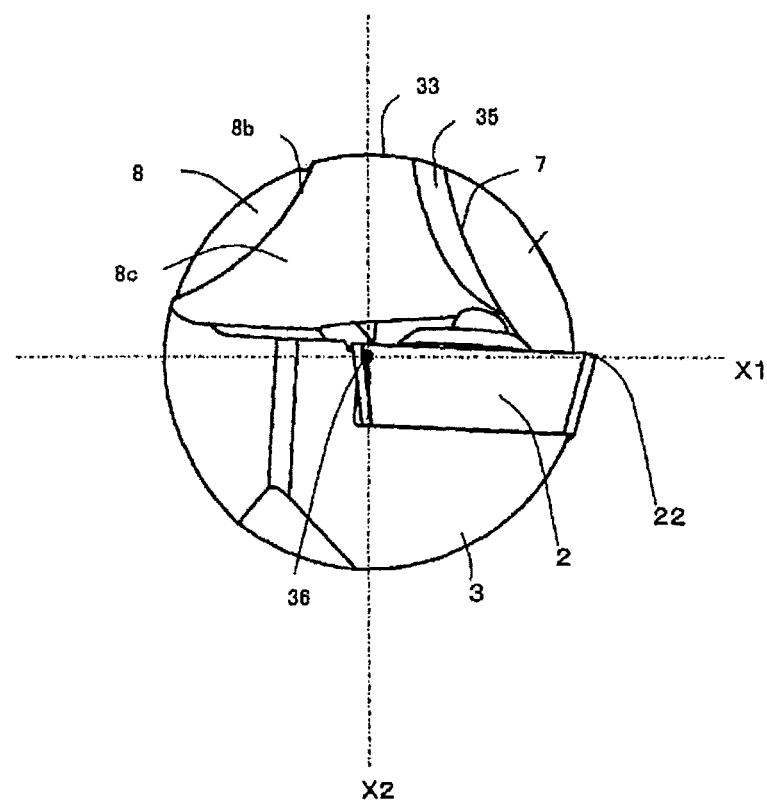
FIG. 18 is a front view illustrating a cutting tool according to a twelfth embodiment of the present invention.
Figure 19:
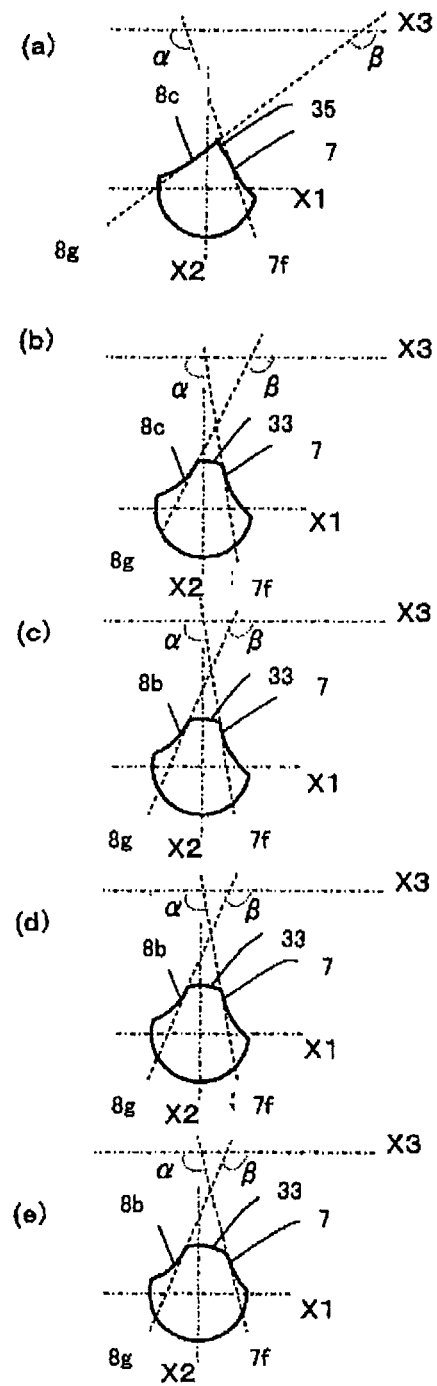
FIG. 19A is a cross-sectional view from the A-A line.
FIG. 19B is a cross-sectional view from the B-B line.
FIG. 19C is a cross-sectional view from the C-C line.
FIG. 19D is a cross-sectional view from the D-D.
FIG. 19E is a cross-sectional view from the E-E line, all shown in FIG. 5B.

An upper surface 20 of the cutting insert 2 is inclined toward the radial direction and the axial direction from the cutting edge 22 as shown FIG. 18. The positions of the first chip pocket and the second chip pocket are specified based on a first reference surface X1 that includes an axis 36 of the holder and passes through the cutting edge 22 and a second reference surface X2 that includes the axis 36 of the holder and is orthogonal to the first reference surface.

The connecting surface 35 connects to the curved surface 8c on the cutting edge 22 side relative to the second reference surface X2. Accordingly, the second chip pocket can ensure a wider opening area on the front side.

The connecting surface 35 approaches the rear end side as approaching the first wall surface portion 7 side from the curved surface 8c side. That is, the connecting surface 35 approaches the rear end side as approaching the first concave-curved surface side from the second concave-curved surface side. Accordingly, not only the opening area on the front side of the second chip pocket but also the opening area on the front side of the first chip pocket can be increased.

As shown in FIGS. 19A to 19E, in each cross-section orthogonal to the axis 36 of the holder, a first tangential line 7f at the upper end of the first wall surface portion 7 and a second tangential line 8g at the upper end of the curved surface 8c (or, on the rear end side relative to the B-B cross-section, the concave groove 8b) intersect at a position away from the first reference surface X1 relative to the upper surface 33 of the land portion.

A reference line X3 that is parallel to the first reference surface X1 and is located on the upper side relative to the upper surface 33 of the land portion and the first tangential line 7f forms an obtuse angle α on the upper end side of the curved surface 8c (or, on the rear end side of the holder relative to the B-B cross-section, the upper end side of the concave groove 8b), and the reference line X3 and the second tangential line 8g form an obtuse angle β on the upper end side of the first wall surface portion 7.

With the abovementioned configuration, each concave-curved surface that forms the first chip pocket and the second chip pocket can ease the angle between the intersection ridge and the upper surface 33 of the land portion. Accordingly, since the rejection of chips flowing onto the periphery of the upper surface 33 of the land portion toward the cutting edge 22 side can be constrained, the chip-discharging properties during cutting can be further improved.

The intersection of the first tangential line 7f and the second tangential line 8g leaves the first reference surface X1 sharply from the A-A cross-section toward the B-B cross-section, while the distance between the intersection and the first reference surface X1 varies gently from the B-B cross-section toward the E-E cross section. This means that the width of the land portion 32 is widened sharply within the first region from the A-A cross-section toward the B-B cross-section and the width of a land portion 31 varies gently within the second region from the B-B cross-section toward the E-E cross section.

By comprising the first region, the first chip pocket and the second chip pocket can be widely opened toward the front side on the front side of the first region, and the rigidity from the rear end side of the first region toward the second region can be increased. As a result, both the chip-discharging properties and the rigidity can be provided.

The lower end of the first wall surface portion 7 extends to the lower side relative to the first reference surface X1. Accordingly, since a pocket for discharging chips can be provided on a portion that nears the workpiece during cutting, the biting of chips in this portion can be constrained. For this reason, the chip-discharging properties can be further improved.

Next, a method of manufacturing a machined workpiece in which a workpiece is cut using the cutting tool is explained with reference to the drawings, using a cutting tool according to the twelfth embodiment of the present invention.

Figure 20:
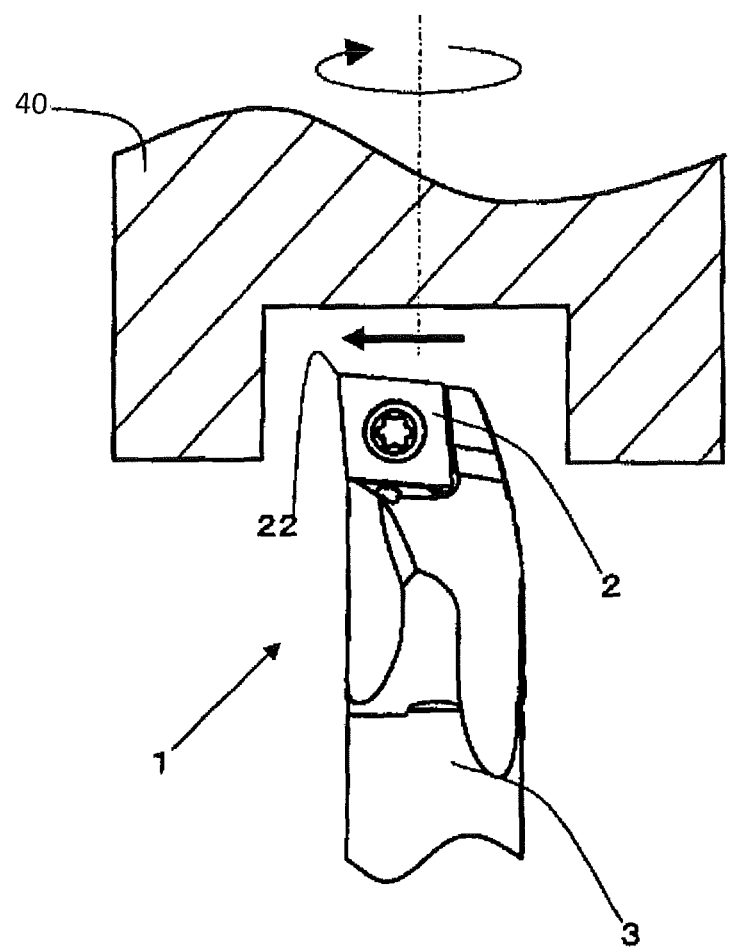
FIG. 20 is a schematic view illustrating a process of a manufacturing method of the machined workpiece according to the present invention.
Figure 21:
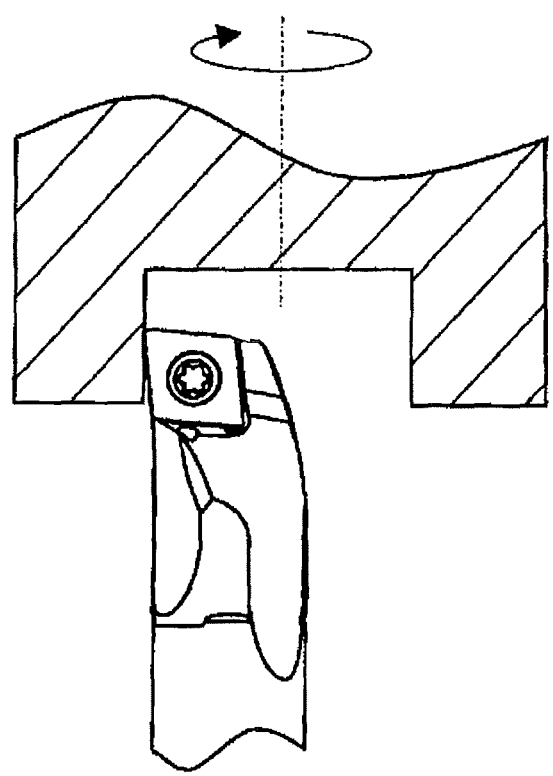
FIG. 21 is a schematic view illustrating a process of a manufacturing method of the machined workpiece according to the present invention.
Figure 22:
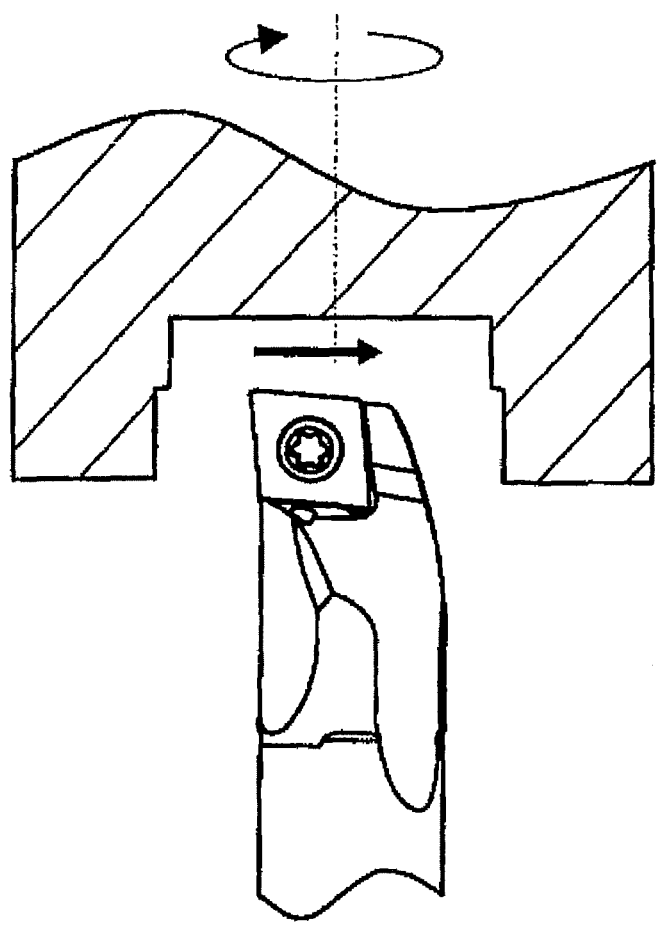
FIG. 22 is a schematic view of a process of a manufacturing method of the machined workpiece according to the present invention.

FIGS. 20 through 22 illustrate processes of manufacturing a machined workpiece in which a workpiece is cut using the cutting tool according to the twelfth embodiment. First, the cutting insert 2 is mounted on the front portion of the holder 3. Then, as shown in FIG. 20, the workpiece 40 is rotated, and the cutting tool 1 is brought closer to the workpiece. The cutting tool 1 and the workpiece 40 only need to be brought relatively closer, and for example, the workpiece 40 may be brought closer to the cutting tool 1.

Next, the cutting edge 22 of the cutting insert 2 is placed into contact with the workpiece 40 to machine the inner diameter of the workpiece. After that, the cutting tool 1 is spaced apart from the workpiece 40. When the cutting is continued, the step in which the workpiece 40 is continuously rotated and the cutting edge 22 of the cutting insert 2 is brought into contact with another portion of the workpiece 40 is repeated.

Although exemplary embodiments according to the present invention have been illustrated above, the present invention is not limited to the above-mentioned embodiments and obviously may be used in any embodiment that does not depart from the substance of the invention.

The invention claimed is:

1. A cutting tool, comprising:
   a cutting insert comprising:
      an upper surface;
      a lower surface;
      a side surface; and
      a cutting edge located on the intersection of the upper surface and the side surface; and
   a holder comprising:
   a mounting portion at a front end portion thereof;
   a first wall surface portion located on an outer peripheral surface of the holder, having a concave-curved surface shape, and extending from a periphery of the mounting portion toward a rear end side of the holder; and
   an edge portion of the first wall surface portion at a position closest to the mounting portion, extending between a upper end point and a lower end point, wherein the upper end point is higher than the lower end point in a side view; wherein:
   the cutting insert is mounted on the mounting portion with the cutting edge protruding outward from an outer peripheral surface of the holder;
   the lower end point is located at a lower position than the cutting edge as viewed from the side surface; and
   the upper end point is located at a higher position than the cutting edge as viewed from the side surface.

2. The cutting tool according to claim 1, wherein the lower end point is located at a higher position relative to the lower surface of the cutting insert as viewed from the side surface.

3. The cutting tool according to claim 1, wherein a lower-end-side edge portion of the first wall surface portion comprises a parallel region that is substantially parallel to a holder axis on the front side thereof as viewed from the side surface.

4. The cutting tool according to claim 1, wherein a lower-end-side edge portion of the first wall surface portion comprises an inclined region that is inclined with a lower position as approaching the rear end side on the front side thereof as viewed from the side surface.

5. A cutting tool, comprising:
   a cutting insert comprising:
      an upper surface;
      a lower surface;
      a side surface; and
      a cutting edge located on the intersection of the upper surface and the side surface; and
   a holder comprising:
   a mounting portion at a front end portion thereof;
   a first wall surface portion located on a first outer peripheral surface of the holder, having a concave-curved surface shape, and extending from a periphery of the mounting portion toward a rear end side of the holder;
   a second wall surface portion located on a second outer peripheral surface of the holder that is located opposite to the first outer peripheral surface with respect to a direction of protrusion of the cutting edge as viewed from a front side and connected to the rear end of the mounting portion; and
   an edge portion of the first wall surface at a position closest to the mounting portion, extending between an upper end point and a lower end point, wherein the upper end point is higher than the lower end point in a side view; wherein
   the cutting insert is mounted on the mounting portion with the cutting edge protruding outward from an outer peripheral surface of the holder;
   the lower end point is located at a lower position than the cutting edge at a position closest to the first wall surface portion and as viewed from the side surface;
   the upper end point is located at a higher position than the cutting edge at a position closest to the first wall surface portion and as viewed from the side surface; and
   the second wall surface portion comprises:
      a first region at a front side having such an inclination that the first region extends towards the rear end of the mounting portion and towards a holder reference surface of that rear end mounting portion; and
      a second region on the rear end side of the first region that is located along the holder axis and has such an inclination that the second region extends in a cross-section perpendicular to the holder axis from the holder reference surface towards the opposite outer peripheral surface; wherein an angle between the holder axis and the upper end portion of the first region in a top plan view is greater than an angle between the holder axis and the upper end portion of the second region.

6. The cutting tool according to claim 5, wherein the first region has an inclination leaving from the holder reference surface as approaching the opposite outer peripheral surface in a radial direction in a cross-section perpendicular to the holder axis.

7. The cutting tool according to claim 5, wherein, in a cross-section perpendicular to the holder axis, the first region has a concave-curved surface shape; and the first region comprises in a top plan view a convexly curved shape extending toward the outer peripheral surface that is located on an opposite side from the outer peripheral surface from which the cutting edge protrudes.

8. The cutting tool according to claim 7, wherein at least part of the upper end portion of the first region has a substantially circular arc shape and an angle between a chord of the arc and the holder axis is equal to or less than an angle between a bisector of a corner portion of the cutting insert and the holder axis.

9. The cutting tool according to claim 7, wherein the curvature radius of the first region in a plurality of cross-sections that are parallel to the holder reference surface and located at regular intervals from each other is decreased as approaching an upper side.

10. A cutting tool, comprising:
   a cutting insert comprising:
      an upper surface;
      a lower surface;
      a side surface; and
      a cutting edge located on the intersection of the upper surface and the side surface; and
   a holder comprising a mounting portion at a front end portion thereof, wherein the cutting insert is mounted on the mounting portion with the cutting edge protruding outward from an outer peripheral surface of the holder, said holder comprising:
      a first wall surface portion having a concave-curved surface shape;
      a second wall surface portion having a concave-curved surface shape; and
      a connecting surface connecting the first wall surface portion and the second wall surface portion; wherein the first wall surface portion is located on the outer peripheral side from which the cutting edge is protruded as viewed from a front surface;

the second wall surface portion is located on the outer peripheral side opposite to the cutting edge as viewed from the front surface; and the connecting surface has a concave shape and comprises at a first position a front end of the connecting surface that is close to the mounting portion of the holder a region in which the width of the connecting surface in a direction orthogonal to a holder axis is smaller than the width of the connecting surface at a second position that is further away from the mounting portion than the first position.

11. The cutting tool according to claim 10, wherein the connecting surface is orthogonal to a first reference surface that passes through the cutting edge and includes the holder axis, is located on a side of the cutting edge relative to a second reference surface including the holder axis, and approaches the rear end side as it nears the first wall surface side from the second wall surface side.

12. The cutting tool according to claim 10, wherein, in a cross-section which is orthogonal to the holder axis and includes an outer peripheral surface of the holder between the first wall surface portion and the second wall surface portion, a reference line that is parallel to a first reference surface that passes through the cutting edge and includes the holder axis, and is located on the upper side relative to the outer peripheral surface of the holder, and a first tangential line on the upper end of the first wall surface portion form an obtuse angle on the upper end side of the second wall surface portion, and the reference line and a second tangential line on the upper end of the second wall surface portion form an obtuse angle on the upper end side of the first concave-curved surface.

13. A method of manufacturing a machined workpiece in which a workpiece is cut using the cutting tool according to claim 1, the method comprising:
   moving the cutting tool relatively closer to the workpiece;
   rotating the workpiece and contacting the cutting edge onto a surface thereof to machine the inner diameter of the workpiece; and
   separating the cutting tool relatively from the workpiece.

* * * * *